(12) United States Patent
Pozzi

(10) Patent No.: US 10,858,106 B2
(45) Date of Patent: Dec. 8, 2020

(54) HEADREST-MOUNTED ELECTRONIC DEVICE HOLDER

(71) Applicant: ROCKWELL COLLINS, INC., Cedar Rapids, IA (US)

(72) Inventor: Alexander N. Pozzi, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/317,200

(22) PCT Filed: Sep. 28, 2017

(86) PCT No.: PCT/US2017/054121
§ 371 (c)(1),
(2) Date: Jan. 11, 2019

(87) PCT Pub. No.: WO2018/035544
PCT Pub. Date: Feb. 22, 2018

(65) Prior Publication Data
US 2019/0225338 A1    Jul. 25, 2019

Related U.S. Application Data

(60) Provisional application No. 62/377,247, filed on Aug. 19, 2016.

(51) Int. Cl.
*B64D 11/00* (2006.01)
(52) U.S. Cl.
CPC .............................. *B64D 11/00152* (2014.12)
(58) Field of Classification Search
CPC ........ B64D 11/00152; B64D 11/00151; B60R 11/0235
See application file for complete search history.

(56) References Cited

U.S. PATENT DOCUMENTS

| 10,315,766 B2 * | 6/2019 | Yokota ................ B60R 11/0235 |
| 2001/0011664 A1 | 8/2001 | Meritt |

(Continued)

FOREIGN PATENT DOCUMENTS

| DE | 102010009626 A1 * | 9/2011 | ......... B60R 11/0235 |
| DE | 102012210754 A1 * | 1/2014 | ......... B64D 11/0624 |

(Continued)

OTHER PUBLICATIONS

Feb. 20, 2018, International Search Report for International Application No. PCT/US17/54121.

*Primary Examiner* — Timothy J Brindley
(74) *Attorney, Agent, or Firm* — Suiter Swantz pc llo

(57) ABSTRACT

In an illustrative embodiment, a frame assembly for enclosing an electronic device mounted to a rear surface of a seatback of an aircraft seat includes a rear frame for mounting within a recess of the rear surface of the seatback, a front frame detachably connected to the rear frame such that the electronic device, when mounted in the frame assembly, is enclosed between the front frame and rear frame, the front frame including an opening defining a boundary of a visible screen region of the electronic device, and an adapter disposed between the rear frame and the rear surface of the electronic device, the adapter including an aperture configured to receive the rear surface of the electronic device and raised peripheral edges surrounding the aperture to adapt the dimensions of the electronic device to the dimensions of the rear frame.

17 Claims, 17 Drawing Sheets

(56) References Cited

U.S. PATENT DOCUMENTS

| | | | |
|---|---|---|---|
| 2004/0212745 A1* | 10/2004 | Chang | B60R 11/0235 348/837 |
| 2004/0262474 A1* | 12/2004 | Boks | F16M 11/041 248/276.1 |
| 2008/0246320 A1* | 10/2008 | Chang | B60R 11/0235 297/217.3 |
| 2010/0162325 A1* | 6/2010 | Bonar | H04N 21/2146 725/76 |
| 2010/0162327 A1* | 6/2010 | Bonar | B64D 11/0015 725/77 |
| 2011/0174926 A1* | 7/2011 | Margis | B60N 3/004 244/118.6 |
| 2011/0181796 A1* | 7/2011 | Caltabiano | B60R 11/0235 348/837 |
| 2011/0316311 A1* | 12/2011 | Westerink | B64D 11/0638 297/163 |
| 2012/0106062 A1 | 5/2012 | Probst et al. | |
| 2012/0248833 A1* | 10/2012 | Hontz | B64D 11/00152 297/188.05 |
| 2016/0009394 A1* | 1/2016 | Felske | B64D 11/0638 297/163 |
| 2016/0249073 A1* | 8/2016 | Margis | H04N 21/2146 |
| 2016/0297526 A1* | 10/2016 | Everhart | B64D 11/00151 |
| 2017/0080876 A1* | 3/2017 | Chang | B60N 2/879 |
| 2017/0129413 A1* | 5/2017 | Yu | F16M 11/14 |
| 2018/0038543 A1* | 2/2018 | Barnes | B64D 11/00152 |

FOREIGN PATENT DOCUMENTS

| | | | | |
|---|---|---|---|---|
| DE | 102019103412 A1 * | 8/2019 | | B60R 11/0235 |
| WO | 2013133810 A1 | 9/2013 | | |
| WO | WO-2014031934 A1 * | 2/2014 | | G06F 1/1601 |
| WO | WO-2016165982 A1 * | 10/2016 | | B64D 11/00152 |
| WO | WO-2017074271 A1 * | 5/2017 | | B64D 11/0638 |

* cited by examiner

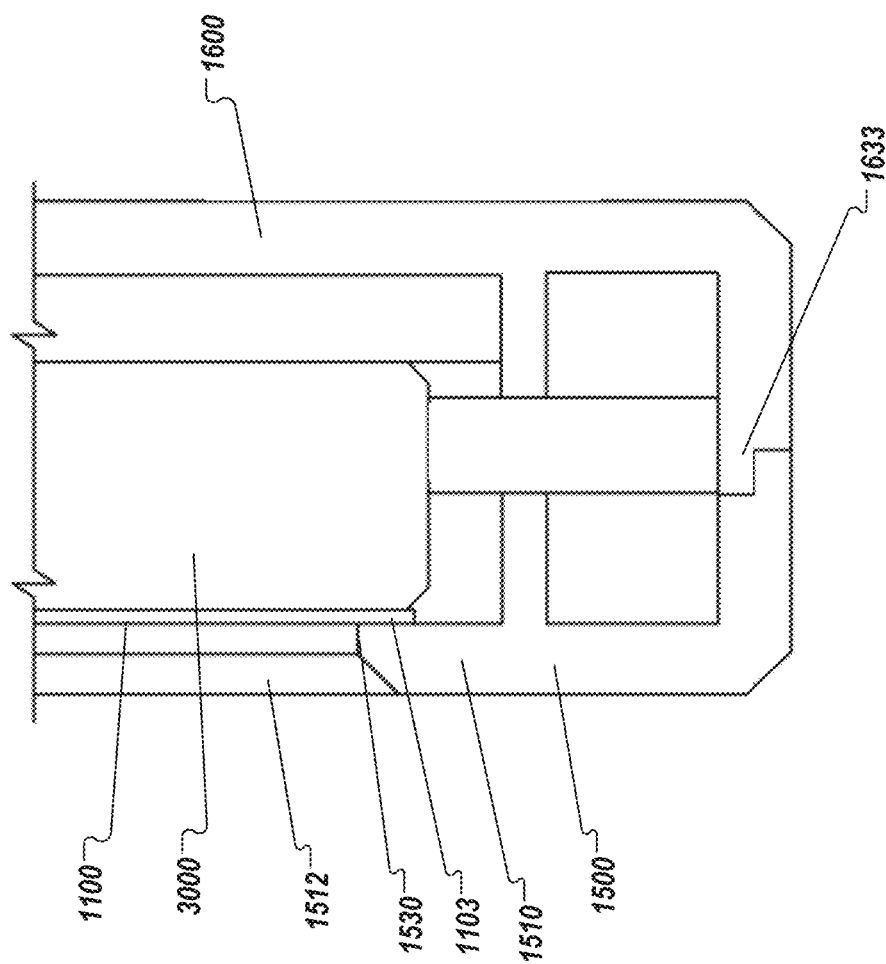

HEADREST-MOUNTED ELECTRONIC DEVICE HOLDER

RELATED APPLICATIONS

This application claims priority to U.S. Provisional Patent Application Ser. No. 62/377,247, entitled "Table Case and Latch," filed Aug. 19, 2016.

This application incorporates by reference, in their entirety, the following prior patent applications: U.S. Pat. No. 8,851,565 to Hontz et al. entitled "Seatback Holder for Tablet Computers," filed Apr. 4, 2012, U.S. patent application Ser. No. 14/955,332, to Gianakopoulos et al., entitled "Passenger Seat with Full Seatback Video Display," filed Dec. 1, 2015, and U.S. patent application Ser. No. 14/234,808 to Hommel et al., entitled "Secure Housing for a Portable Computer." All above identified applications are hereby incorporated by reference in their entireties.

BACKGROUND

In today's commercial flights providing personalized entertainment to passengers is essential. Such a demand for personalized entertainment can be addressed with headrest-mounted entertainment devices, which may include individual electronic devices such as touch screens or computer tablets that are mounted onto back portions of the aircraft seats. To this end, conventional assemblies supporting attachment of the individual electronic devices onto the aircraft seats, e.g. housings with fastening devices, have been adopted.

Although such conventional assemblies are widely used, they present important drawbacks. Notably, such conventional assemblies lack universality, versatility, and interchangeability, which may be constructed to fit only one predetermined type of electronic device and cannot be used with multiple types of commercial off-the-shelf (COTS) electronic devices having different configurations, dimensions, shapes, screen sizes, input ports, and/or output ports. In addition, disassembling these conventional assemblies to replace and/or repair the electronic devices mounted onto the aircraft seats can be cumbersome, time consuming, and may require specific tools that may not readily be available.

Thus, an electronic device assembly to support electronic devices onto the aircraft seats solving the problems of universality, versatility, and interchangeability is desired.

SUMMARY OF ILLUSTRATIVE EMBODIMENTS

The forgoing general description of the illustrative implementations and the following detailed description thereof are merely exemplary aspects of the teachings of this disclosure, and are not restrictive.

The present disclosure relates to assemblies for electronic devices. Particularly, the present disclosure relates to assemblies for encapsulating electronic devices and for mounting the electronic devices onto a seat of an aircraft.

Accordingly, the present disclosure relates to an assembly for electronic devices which overcomes the above-mentioned limitations of universality, versatility, and interchangeability by providing a multitude of elements that can take different geometrical configurations, e.g. shapes and/or dimensions, and/or can be me easily dismounted and/or mounted onto aircraft seats.

In one non-limiting illustrative example, an electronic device assembly to enclose and mount an electronic device onto an aircraft seat is presented. The electronic device assembly may include a back frame that receives a screen portion of the electronic device, a screen protector that covers the screen portion of the electronic device; an adaptor that surrounds side portions of the electronic device and maintains in place the electronic device in the back frame, a power assembly that connects the electronic device to an power system of the aircraft, an audio assembly that connects to an audio port of the electronic device, and a front frame. The front frame having an opening that faces the screen portion of the electronic device, and a lip that defines the opening and that receives the screen protector and incases into the back frame to enclose the electronic device, where the back frame is affixed onto a support structure of the aircraft.

In one non-limiting illustrative example, an electronic device assembly to enclose and mount an electronic device onto an aircraft seat is presented. The electronic device assembly may include an articulable back frame that receives a back portion of the electronic device, a screen protector that covers a screen portion of the electronic device, an adaptor that surrounds side portions of the electronic device and maintains in place the electronic device in the articulable back frame, a power assembly that connects the electronic device to an power system of the aircraft, an audio assembly that connects to an audio port of the electronic device, and a front frame. The front frame having an opening that faces the screen portion of the electronic device, and a lip that defines the opening and that receives the screen protector and incases into the articulable back frame to enclose the electronic device, where the articulable back frame is rotatably mounted onto a frame of the seat.

In one non-limiting illustrative example, an electronic device assembly to enclose and mount an electronic device onto an aircraft seat is presented. The electronic device assembly may include an outer shell to be inserted into the seat, a back frame assembly having a back frame that receives a back portion of the electronic device, and a back support that affixes onto a back portion of the back frame, a screen protector that covers a screen portion of the electronic device, an adaptor that surrounds middle portions of the electronic device and maintains in place the electronic device in the back frame, a front frame having an opening that faces the screen portion of the electronic device, a lip that defines the opening and that receives the screen protector and incases into the back frame to enclose the electronic device, where the back support is rotatably mounted onto the outer shell.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 2E is a sectional view of a lower portion of an electronic device enclosed between a front frame and back frame of the electronic device assembly;

DETAILED DESCRIPTION OF ILLUSTRATIVE EMBODIMENTS

Figure 1:
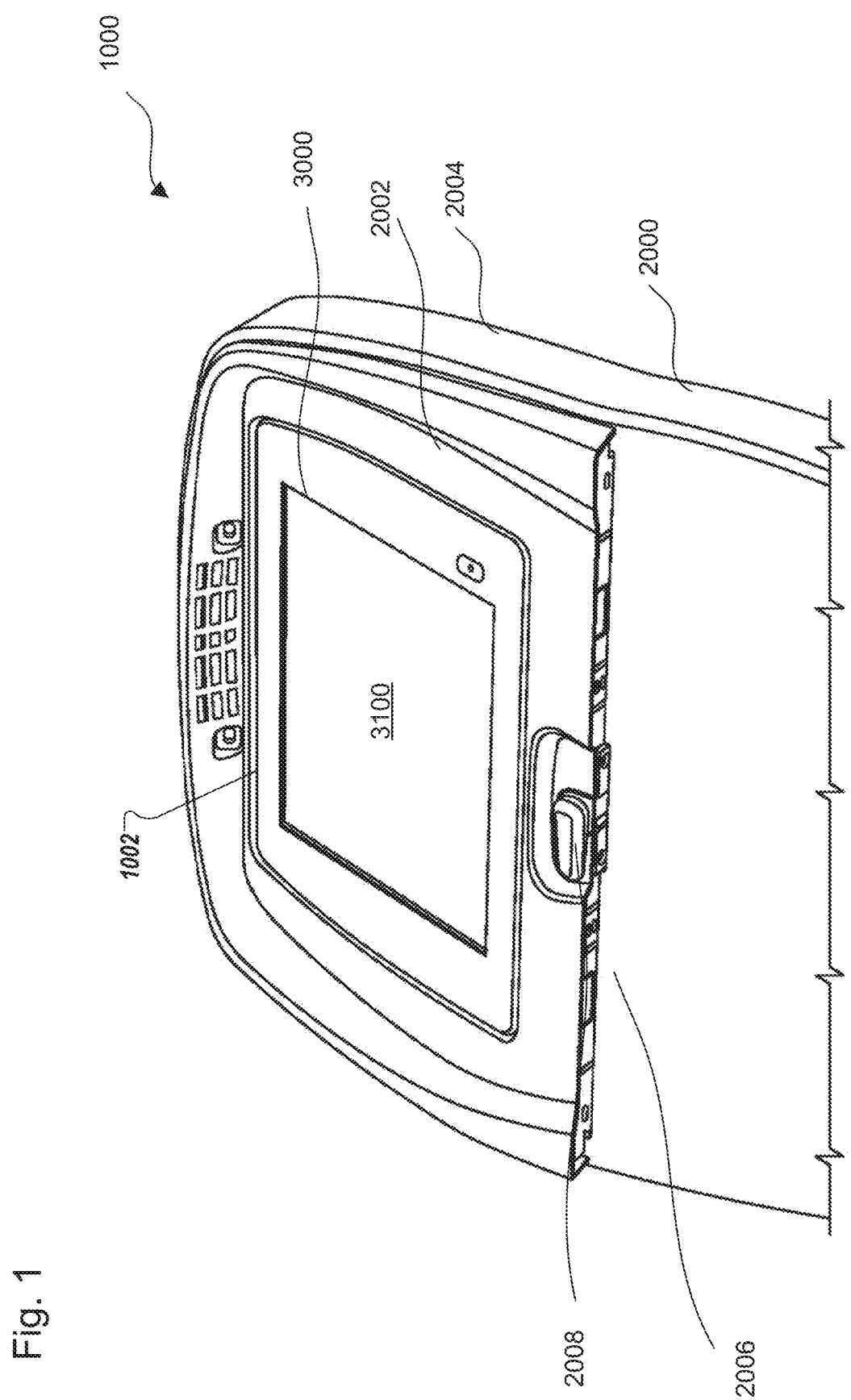
FIG. 1 is a front perspective view of an electronic device assembly mounted within a back portion of an aircraft seat.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that feature or function may be deployed, utilized or implemented in connection with the alternative embodiment unless the feature or function is incompatible with the alternative embodiment.

Turning to the figures, FIG. 1 illustrates an electronic device assembly 1000 installed within a back portion of an aircraft seat 2000 is illustrated. In some implementations, the back portion of the aircraft seat 2000 where the electronic device assembly 1000 is installed may be a rear face 2002 of an upper seatback portion 2004 of the aircraft seat 2000. For example, the rear face 2002 may be directly opposite a face where a head rest for the aircraft seat 2000 is mounted. In some examples, the electronic device assembly 1000 may be mounted above a securing mechanism 2008 for a tray table (not shown) when the tray table is folded into a stowed position adjacent to a tray table stowage surface 2006. In some aspects, the rear face 2002 of the upper seatback portion 2004 of the aircraft seat 2000 may include a shelf or recess into which the electronic device assembly 1000 is inserted or mounted such that the electronic device assembly 1000 may be substantially flush with the rear face 2002 of the upper seatback portion 2004 of the aircraft seat 2000 when mounted to the aircraft seat 2000.

In some implementations, the electronic device assembly 1000 may be configured to enclose an electronic device 3000 by allowing the electronic device 3000 to be mounted onto or within the upper seatback portion 2004 of the aircraft seat 2000 to provide individualized entertainment for a passenger seating behind the aircraft seat. In some examples, when the electronic device 3000 is mounted to the electronic device assembly 1000, a screen of the electronic device 3000 may be substantially flush with the rear face 2002 of the upper seatback portion 2004 of the aircraft seat 2000.

In some examples, the electronic device 3000 can be any kind of Commercial off-the-shelf (COTS) electronic device capable of displaying images, videos, and/or sounds to the passenger and may also be capable of receiving inputs and/or commands from passenger via input/output devices, such as an input/output module (TOM) with pushbuttons on an armrest of the aircraft seat 2000 that is communicatively coupled to the electronic device 3000. In some examples, the electronic device 3000 may include an integrated IOM such as a tablet computer with a screen 3100 such as a touch screen that is configured to display images or videos to the passenger and also receive inputs from the passenger at the touchscreen.

In some implementations, the aircraft seat 2000 may generally be a commercial aircraft passenger seat and be of type that may be found in a commercial aircraft. For example, the aircraft seat 2000 can be an economy class aircraft seat or a business class aircraft seat that can be fixed or reclinable. In some examples, the electronic device assembly 1000 can be articulably or tiltably mounted onto the aircraft seat 2000, as illustrated in FIGS. 2A-2D, fixedly attached to the aircraft seat 2000, as illustrated in FIGS. 3A-3D, or articulably or tiltably nested into the aircraft seat 2000, as illustrated in FIGS. 4A-4D. For the implementations where the electronic device assembly 1000 is tiltably mounted to the aircraft seat 2000, the electronic device assembly 1000 may be configured to tilt forward and rearward about an upper edge 1002 of the electronic device assembly such that a screen 3100 of the electronic device 3000 can remain at a substantially vertical viewing orientation when a position of a seat back of the aircraft seat 2000 is adjusted, such as when the aircraft seat 2000 is reclined.

Turning to FIGS. 2A-2G of the drawings, the electronic device assembly 1000 that is articulably mounted to the aircraft seat 2000 is illustrated. Throughout the disclosure, references to the electronic device assembly 1000 being articulably mounted to the aircraft seat 2000 mean that an orientation of a screen 3100 of the electronic device 3000 within the electronic device assembly 1000 can be adjusted by pivoting or tilting the electronic device assembly 1000 to optimize viewing of the screen 3100 by the passenger such as when the aircraft seat 2000 is reclined or another aircraft seat in which the passenger viewing the screen 3100 is sitting is reclined. In addition, references to articulating the screen may refer to adjusting the orientation angle of the screen (e.g., forward and rearward, side-to-side).

Figure 2B:
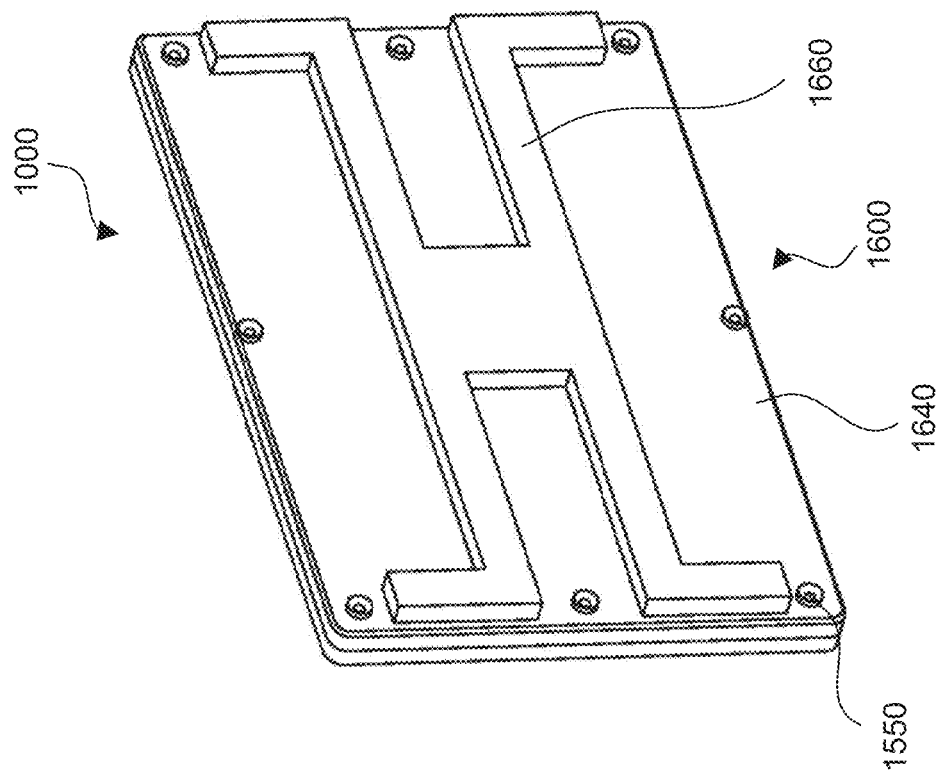
FIG. 2B is a rear perspective view of the electronic device assembly.
Figure 2A:
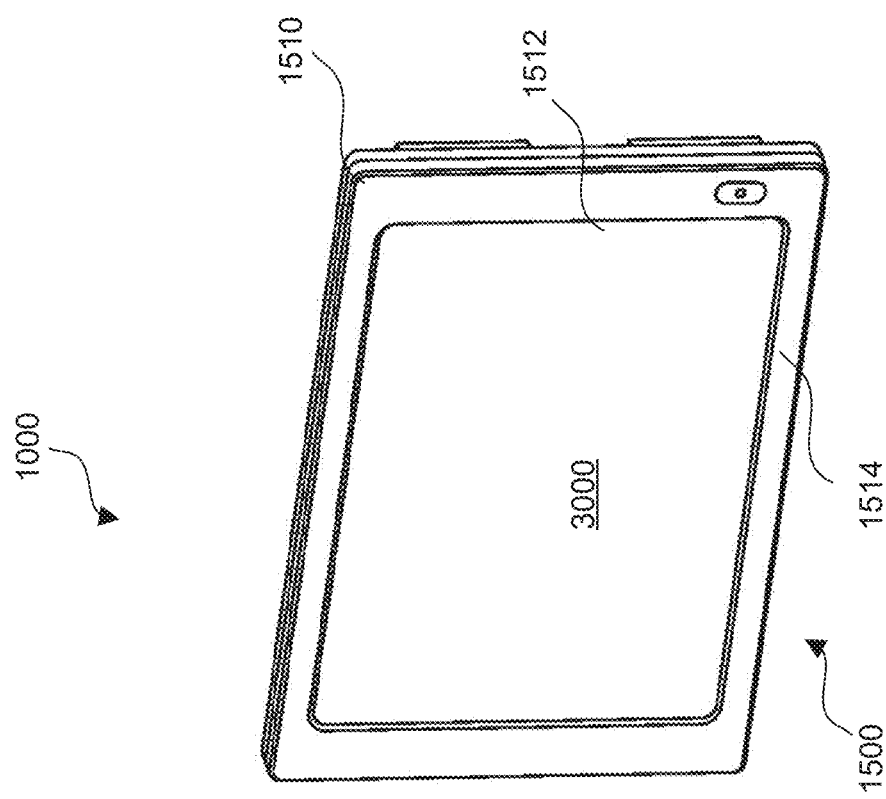
FIG. 2A is a front perspective view of an electronic device assembly.
Figure 2C:
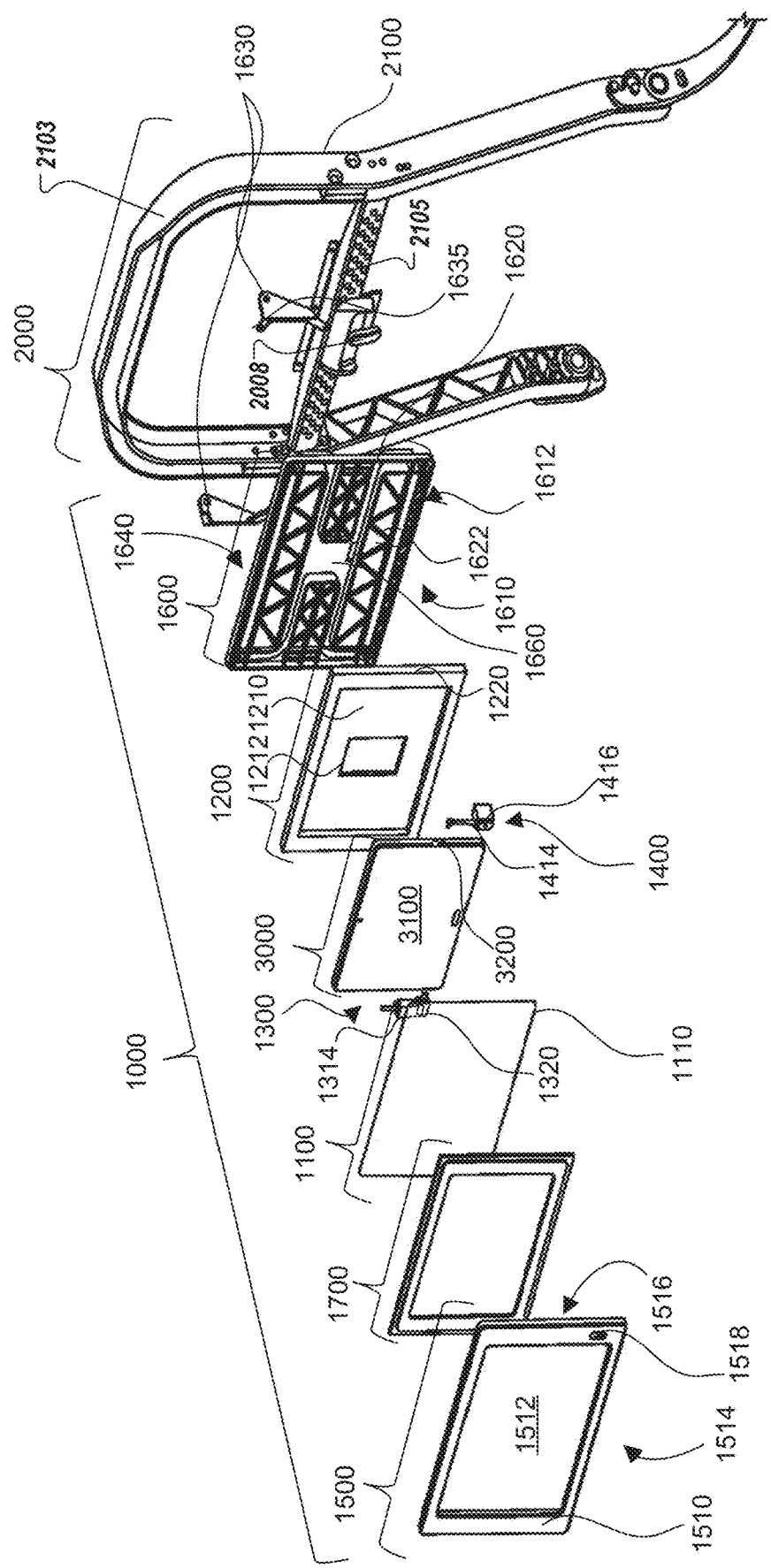
FIG. 2C is a front exploded view of the electronic device assembly mounted onto the back portion of the aircraft seat.
Figure 2D:
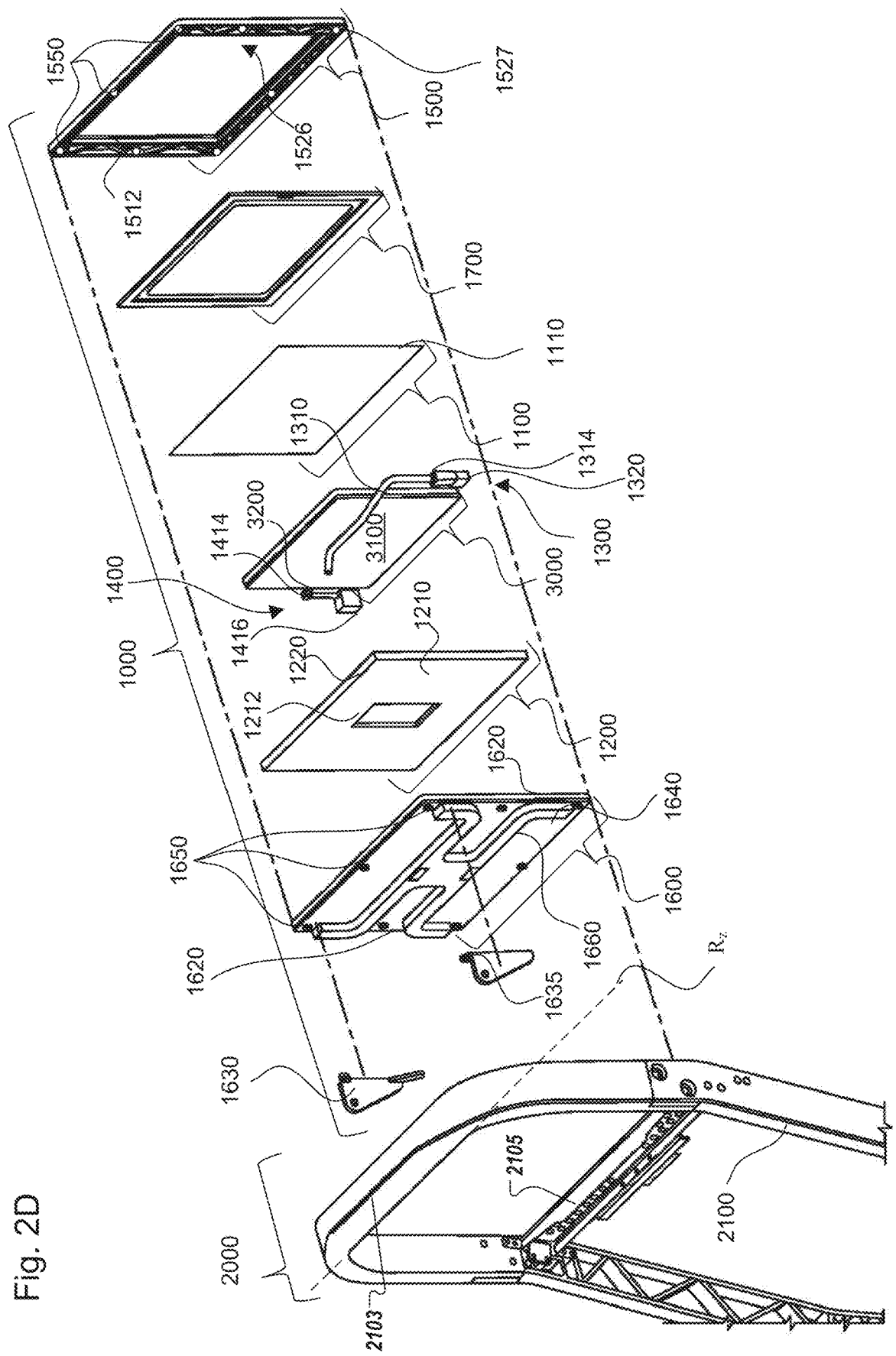
FIG. 2D is a back exploded view of the electronic device assembly mounted onto the back portion of the aircraft seat.

As shown in the exploded views of the electronic device assembly 1000 of FIGS. 2C-2D, the electronic device assembly 1000 can include a screen protector 1100 that covers a front portion of the electronic device 3000, the screen 3100, an adapter 1200 that receives and maintains the electronic device 3000 in place within the electronic device assembly 1000, a power assembly 1300 that connects the electronic device 3000 to an power system and/or data system of the aircraft, an audio assembly 1400 that connects to an audio port 3200 of the electronic device 3000, a front frame 1500 that receives the screen protector 1100 and the front portion of the electronic device 3000, and an articulable back frame 1600 that receives the adapter 1200 and the back portion of the electronic device 3000. In some examples, the articulable back frame 1600 is configured to be coupled to the front frame 1500 such that the electronic device 3000 may be snugly enclosed between the front frame 1500 and back frame 1600 when the electronic device assembly 1000 is mounted to the aircraft seat 2000. In some examples, the front frame 1500 and back frame 1600 may include complementary connectors that allow the front frame 1500 to snap or slide into the complementary connectors of the back frame 1600.

In some implementations, the front frame 1500 may include a peripheral border 1510 that defines an opening 1512 to provide visibility for the screen 3100 of the electronic device 3000. For example, the peripheral border 1510 can include a front portion 1514 that faces the passenger and a back portion 1516 that faces an outer edge of the electronic device 3000. In some embodiments, the front portion 1514 of the peripheral border 1510 may include input elements 1518 disposed within the surface of the front portion 1514 that provide passengers access to input ports or other types of input elements of the electronic device 3000. In some implementations, the input elements 1518 of the front portion 1514 may be aligned with input elements of the electronic device 3000 such that activation of the input elements 1518 on the front portion 1514 may correspondingly activate an input element on the electronic device 3000. For example, the input elements 1518 can be push buttons to turn on/off the electronic device 3000, as illustrated in FIGS. 2A-2C, or to adjust settings of the electronic device 3000, such as luminosity, color contrast, or sound volume. In some embodiments, the front portion 1514 of the peripheral border 1510 of the electronic device assembly 1000 may also include aesthetic elements to appear visually and/or sensitively pleasing and/or to attract attention of the passenger. For example, the aesthetic elements can be a smooth surface finish and rounded edges and/or corners.

In some embodiments, a back portion 1516 of the peripheral border 1510 may have structural elements 1526 to provide rigidity to the front frame 1500 in order to distribute impact loads in accordance with the head injury criterion (HIC). For example, the structural elements 1526 may include a number of ridges 1527 that protrude substantially perpendicularly from the back portion 1516 of the peripheral border 1510 and form a ribbing on the back portion 1516. In some examples, the ridges may be made of polyetherimide (PEI) or polysulfone (PSU) plastic. In some examples, the ridges 1527 may be arranged in pre-determined patterns on the back portion 1516, such as in a zig-zag pattern, hash mark pattern, diagonal crisscross pattern, randomized pattern, or a combination of the patterns. In an alternative example, the back portion 1516 may be manufactured without ridges 1527, and instead of the front portion 1514 and the back portion 1516 of the peripheral border 1510 may be made of a material such as aluminum (e.g. 6061-T6 aluminum) that provides structural support and adheres to both HIC and flammability specifications.

In some implementations, the screen protector 1100 may be disposed between the front frame 1500 and the screen 3100 of the electronic device 3000, and may include a sheet of transparent material that covers and protects the screen 3100 of the electronic device 3000 against physical damage from impact events such as puncturing, scratching, or otherwise applying a large amount of force and may prevent glass from ejecting from the electronic device assembly 1000 toward the passenger when the screen 3100 of the electronic device 3000 is broken, such as during a crash or collusion of objects and/or passengers against the electronic device 3000. In some examples, the transparent material of the screen protector 1100 can be a plastic material, e.g. polyethylene terephthalate, or thermoplastic polyurethane, or tempered glass. The screen protector, in some embodiments, includes electrically transparent material for supporting touch screen interaction with the electronic device.

In some aspects, the screen protector 1100 may be affixed to the screen 3100 of the electronic device 3000 and held in place by the front frame 1500 and/or the articulable back frame 1600. For example, the screen protector 1100 has dimensions that are greater than the dimensions of the opening 1512 of the front frame such that peripheral edges 1110 of the screen protector 1100 extend past the opening 1512 of the front frame 1500 and may be sandwiched or nested between the front frame 1500 and the electronic device 3000 when the front frame 1500 is coupled to the back frame 1600. For example, FIG. 2E illustrates a sectional view of a lower portion of the electronic device assembly 1000 including the electronic device 3000 enclosed by the front frame 1500 and the back frame 1600 and include the screen protector 1100 disposed between the opening 1512 of the front frame 1500 and the back frame 1600.

As shown in FIG. 2E, an outer edge 1103 of the screen protector 1100 may extend beyond the opening 1512 of the front frame 1500 such that the outer edge 1103 may be nested between the front frame 1500 and the electronic device 3000. In addition, the peripheral border 1510 of the front frame 1500 may include a chamfered or beveled edge 1530 at the opening 1512 of the front frame 1500 to assist with preventing a passenger's head or nose from catching on the front frame 1500 during a HIC event. For example, the chamfered or beveled edge 1530 may permit the passenger's head to slide across the electronic device assembly 1000 when the passenger's head impacts the electronic device assembly 1000 during the HIC event.

In addition, FIG. 2E also illustrates features of the connection between the front frame 1500 and back frame 1600 enclosing the electronic device 3000 within the electronic device assembly 1000. In some implementations, the back frame 1600 may include at least one lap joint 1633 at a connection surface with the front frame 1500 in order to assist with transfer of load between the front frame 1500 and back frame 1600 and reduce concentrated loading at fastener mounting points 1550. The lap joint 1633 may be located at a lower connection surface between the front frame 1500 and back frame 1600 of the electronic device assembly 1000. In some examples, additional lap joints may also be added between bosses and other rip features to further share or distribute loading between the front frame 1500 and back frame 1600. For example, an additional lap joint may be added at an upper connection surface between the front frame 1500 and back frame 1600.

In some implementations, the electronic device assembly 1000 may also include a power assembly 1300 with a power cable 1310 as shown in FIG. 2D having a first power connector that is disposed at a first end that is configured to connect to a power grid of the aircraft. In some examples, the first power connector for the power cable 1310 may be removably attached to a main line of the power grid of the aircraft to facilitate maintenance, repairs, and/or installation of the electronic device assembly 1000.

In addition, a second power connector 1314 disposed at a second end of the power cable 1310 may be configured to connect to the electronic device 3000 to provide electronic power from the aircraft power grid to the electronic device 3000. In some examples, the second power connector 1314 may be configured to connect directly to a power/charging connection of the electronic device 3000 or to another adaptable fitting that connects the power/charging connection of the electronic device 300 to the second power connector 1314.

In some embodiments, the power assembly 1300 can be configured to be hidden or inaccessible by the passenger interacting with the electronic device assembly 1000. For example, the power cable 1310 may run along a back surface of the electronic device 3000 and inside the aircraft seat 2000, and the second power connector 1314 can be configured to be sufficiently small to be disposed within the electronic device assembly 1000, such as between the connected front frame 1500 and back frame 1600 of the electronic device assembly 1000.

In some embodiments, the power assembly 1300 can also data cables and associated circuitry configured to transmit and communicate data from an in-flight entertainment circuit of the aircraft to the electronic device 3000. For example, the power cable 1310 may be a jig cable and the second power connector 1314 may be a data connector such as a USB-type connector configured to transmit power and data, e.g. videos and/or images, from the power grid and/or from the in-flight entertainment circuit of the aircraft to the electronic device 3000, and vice-versa. In other examples, the power assembly 1300 may include a wireless communication radio such as a WI-FI, Bluetooth, Zigbee, or Ultra Wideband (UWB) radio and associated circuitry that is configured to communicate with a remote in-flight entertainment controller for the electronic device 3000.

In another example, the power assembly 1300 can include an additional electrical port 1320 coupled to the second power connector 1314 that provides the passenger the ability to connect an additional personal electronic device to the power assembly 1300 for charging the personal electronic device. In addition, the additional electrical port 1320 may provide the ability for the personal electronic device to communicate with the electronic device 3000. For example, the personal electronic device may be used as an input/output device for the electronic device 3000.

In some implementations, the electronic device assembly 1000 may include an audio assembly 1400 having an audio cable, a first audio connector that ends at a first end of the audio cable and connects to an audio port of the aircraft seat 2000, and a second audio connector 1414 that ends at a second end of the audio cable and connects to the audio port 3200 of the electronic device 3000. In some aspects, the second audio connector 1414 can be a male plug and the audio port 3200 can be a corresponding female jack configured to receive the male plug. In some embodiments, similarly to the power assembly 1300, the audio assembly 1400 can be configured to be hidden or inaccessible by the passenger interacting with the electronic device assembly 1000. For example, the audio cable of the audio assembly 1400 can run along a back portion of the electronic device 3000 and inside the aircraft seat 2000, and the second audio connector 1414 can be configured to be sufficiently small to be disposed within the electronic device assembly 1000, such as between the connected front frame 1500 and back frame 1600 of the electronic device assembly 1000.

In some examples, the audio assembly 1400 can include a supplementary audio port 1416 coupled to the second audio connector 1414 that provides to the passenger an audio connection for headphones or other device with an audio connection. For example, the supplementary audio port 1416 can be a female jack that is configured to receive a male plug from the personal passenger headphones.

In some implementations, the adapter 1200 of the electronic device assembly 1000 can include a tray 1210 to receive the back portion of the electronic device 3000, and peripheral edges 1220 that protrude from the tray 1210 thereby defining a boundary of the tray 1210 surrounding the electronic device 3000 to maintain the electronic device 3000 snugly in place within the tray 1210. In some examples, the dimensions of the tray 1210 that receives the back portion of the electronic device 3000 may correspond to the dimensions of the electronic device 3000 such that the electronic device 3000 fits snugly between the peripheral edges 1220 of the adapter 1200. In some implementations, the electronic device assembly 1000 may be manufactured with a set of multiple adapters 1200 having the same total length and width but varied tray and peripheral edge dimensions such that different types of commercially available electronic devices 3000 may be secured within the electronic device assembly 1000. In some examples, manufacturing and installing an adapter 1200 to fit the dimensions of a newly available electronic device 3000 is less expensive and time consuming than manufacturing an entire new type of electronic device assembly 1000 when new electronic devices come on the market or modifications to the dimensions of existing electronic devices are made.

In some embodiments, the adapter 1200 can be composed a number of filler elements having different shapes and dimensions configured to match different dimensions and/or shapes that the electronic device 3000 can have. For example, the number of elements may include rectangular cuboids, triangular and/or trapezoidal plates, having lengths commensurate with lengths of the peripheral edges 1220 of the adapter 1200 and widths sufficiently large to maintain the electronic device 3000 in place. In some embodiments, the adapter 1200 can be made of materials having sufficient cushioning performance and impact dampening to secure and maintain the electrical device 3000 in place within the adapter 1200 when the aircraft experiences turbulence or other unexpected motion. For example, the adapter 1200 can be made of natural and/or manufactured foams such as polyurethane foam, polystyrene, or phenolic.

In some implementations, the adapter 1200 may be configured to secure and/or hide the power cable 1310 of the power assembly 1300 and/or the audio cable of the audio assembly 1400 within the electronic device assembly 1000. For example, the tray 1210 of the adapter 1200 can have an opening 1212 that provides an egress path for the power cable 1310 of the power assembly 1300 and/or the audio cable of the audio assembly 1400 from a rear surface of the adapter 1200.

In some implementations, the electronic device assembly 1000 may include an articulable back frame 1600 with a front portion 1610 that receives the tray 1210 of the adapter 1200, sides 1620 that define a front portion 1610, brackets 1630 mounted on sides 1620, and a back portion 1640 that faces the aircraft seat 2000 as illustrated in FIGS. 2C-2D. In some embodiments, the front portion 1610 of the articulable back frame 1600 may have structural elements 1612 that provide rigidity for the articulable back frame 1600 in order to distribute impact loads in accordance with the HIC. For example, the structural elements 1612 of the articulable back frame 1600 may be a number of ridges 1622 that protrude substantially perpendicularly from the back portion 1640 of the articulable back frame 1600 and form a ribbing on the back portion 1640 of the articulable back frame 1600.

In some examples, the ridges 1622 may be made of PEI or PSU plastic. In some examples, the ridges 1622 may be arranged in pre-determined patterns on the back portion 1640, such as in a zig-zag pattern, hash mark pattern, diagonal crisscross pattern, randomized pattern, or a combination of the patterns. In an alternative example, the back portion 1640 may be manufactured without ridges 1622, and instead of the front portion 1610 and the back portion 1640 may be made of a material such as aluminum (e.g. 6061-T6 aluminum) that provides structural support and adheres to both HIC and flammability specifications.

In some embodiments, the articulable back frame 1600 can be configured to secure and/or hide the power cable 1310 of the power assembly 1300 and/or the audio cable of the audio assembly 1400. For example the articulable back frame 1600 may include channels 1660 disposed on a surface of the back frame 1600 that are configured receive the power cable 1310 of the power assembly 1300 and/or the audio cable of the audio assembly 1400. In some examples, the channels 1660 may be grooves on the front portion 1610 of the articulable back frame 1600 that extend between the sides 1620 of the articulable back frame 1600 and intersect at a central region of the back portion 1640 of the articulable back frame 1600 in order to receive the power cable 1310 of the power system 1300 and/or the audio cable from the audio system 1400 and provide a path for the power cable 1310 and/or the audio cable to the aircraft seat 2000 without increasing a thickness of the back frame 1600 or a total thickness of the electronic device assembly 1000.

In some embodiments, the front frame 1500 and the articulable back frame 1600 can include mounting elements to affix the front frame 1500 to the articulable back frame 1600 to enclose the electronic device 3000 within the electronic device assembly 1000. For example, the front frame 1500 can include a number of threaded holes 1550 and the articulable back frame 1600 can include a number of through holes 1650 that match the number, size, shape, and locations of threaded holes 1550 on the front frame 1500, and a number of fasteners such as screws or bolts configured to be inserted into the number of through holes 1650 and fastened to the threaded holes 1550.

In some embodiments, the electronic device assembly 1000 can include bezels 1700, which function as another adapter device between the front frame 1500 and a front surface of the electronic device 3000 to accommodate different geometrical characteristics, shapes, and/or dimensions of the electronic device 3000. For example, the bezels 1700 can be composed of concentric elements having different shapes and dimensions configured to match the geometrical characteristics of the screen 3100 of the electronic device 3000. In some implementations, elements may include rectangular cuboids, triangular and/or trapezoidal plates having dimensions commensurate with dimensions of the electronic device assembly 1000 and sufficiently large to hold the electronic device 3000 in place between the front face 1500 and back face 1600, as illustrated in FIG. 2D. In some embodiments, the bezels 1700 can be made of materials having sufficient cushioning performance and impact dampening to hold the electrical device 3000 securely in place when the aircraft experiences turbulence or other sudden, unexpected motion. For example, the bezels 1700 can be made of natural and/or manufactured foam materials such as polyurethane foam, polystyrene, or phenolic.

In some embodiments, the electronic device assembly 1000 can be articulably mounted onto an upper portion of a seatback frame 2100 for the aircraft seat 2000 to provide for adjusting a position and/or orientation angle of the screen 3100 of the electronic device 3000 to optimize viewing of the screen 3100 by the passenger when the aircraft seat 2000 is reclined or when the aircraft seat in which the passenger viewing the screen 3100 is seated is reclined. In some implementations, the upper portion of the seatback frame 2100 to which the electronic device assembly 1000 is mounted may be configured to support a headrest for the aircraft seat 2000 and may include a curved member 2103 that frames the upper portion 2004 of the aircraft seat 2000 and a cross-member 2105 mounted laterally between opposing ends of the curved member 2103 that forms a lower end of the upper portion 2004 of the aircraft seat 2000. In some examples, the electronic device assembly 1000 can be tilted through a partial rotation around a substantially horizontal axis of rotation (labeled $R_Z$ in FIG. 2D) at an upper edge of the curved upper member 2103 of a seatback frame 2100 and an upper portion of the electronic device assembly 1000 to tilt the screen 3100 forward and rearward with respect to the upper edge of the curved upper member 2103 of the seatback frame 2100.

For example, the electronic device assembly 1000 can include brackets 1630 that rotably connect the articulable back frame 1600 of the electronic device assembly 1000 to the frame 2100 of the aircraft seat 2000. The brackets 1630 can have forward ends affixed to the sides 1620 of the articulable back frame 1600 and inward ends rotably affixed around the rotation axis $R_Z$ and nested within the frame 2100 of the aircraft 2000, as illustrated in FIG. 2D. The brackets 1630 may include rotating elements 1635, e.g. bearings, hinges, shafts and/or bores, placed between the brackets 1630 and the articulable frame 2100 of the aircraft seat 2000 to provide the articulation or tilting motion of the electronic device assembly 1000 about the horizontal $R_Z$ axis.

Figure 2G:
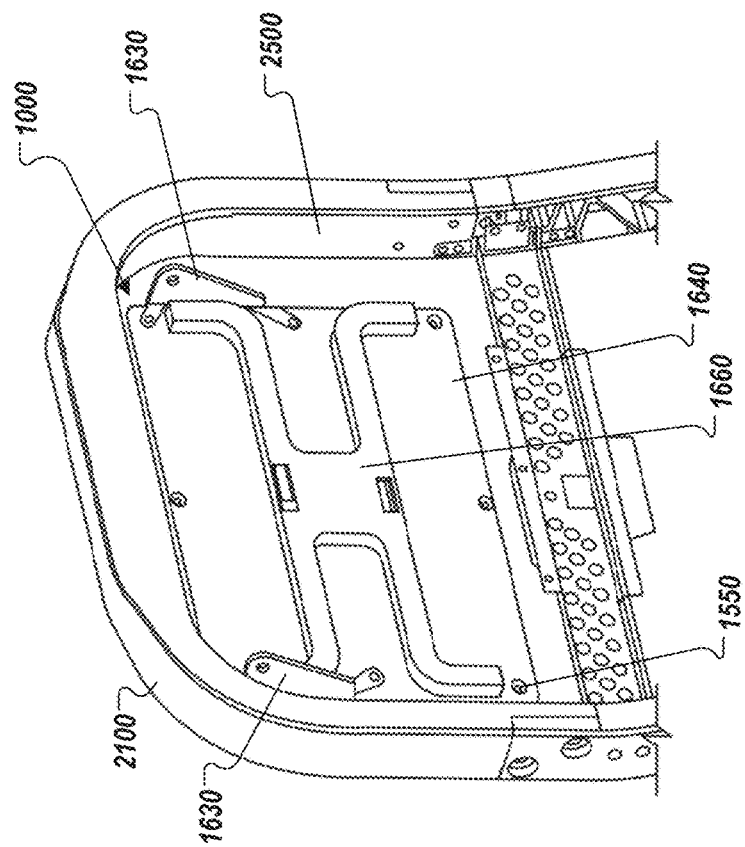
FIGS. 2F-2G illustrate perspective views of an electronic device assembly pivotably connected to a frame of an aircraft seat.
Figure 2F:
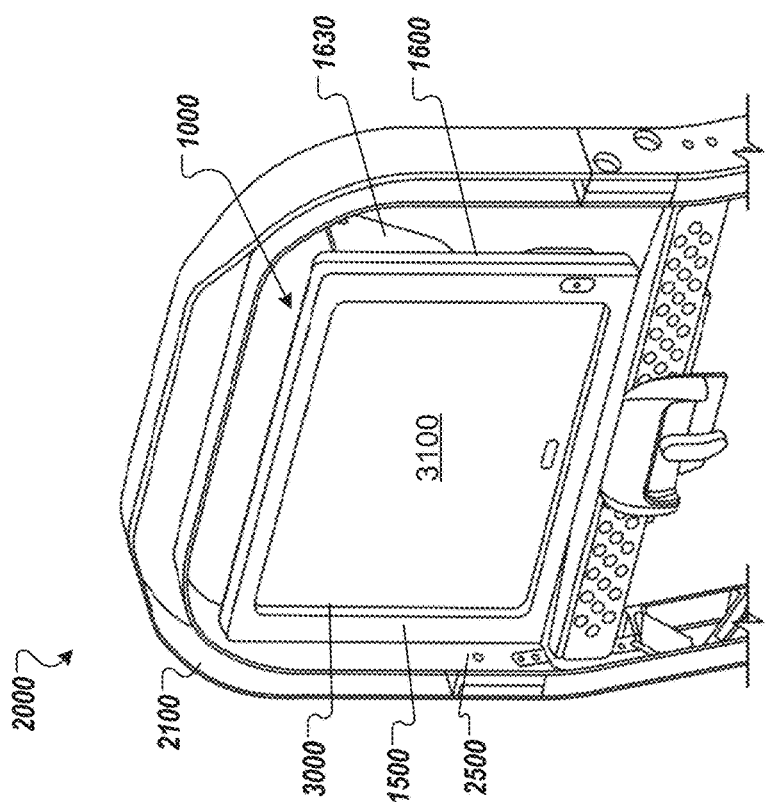

FIGS. 2F-2G provide forward and rear perspective views of the electronic device assembly 1000 pivotably connected to inner edges 2500 of an upper portion of the seat frame 2100 of the aircraft seat 2000. In some implementations, the brackets 1630 pivotably connect the back frame 1600 to the seat frame 2100 at an upper edge such that the electronic device assembly 1000 is able to rotate forward and rearward with respect to the seat frame 2100, which allows the screen 3100 of the electronic device 3000 to maintain a vertical orientation angle even when the aircraft seat 2000 is reclined. In some implementations, attachment of the brackets 1630 and/or rotating elements 1635 to the inner edges 2500 of the seat frame 2100 may be achieved as described in U.S. Pat. No. 8,851,565 to Hontz et al. entitled, "Seatback Holder for Tablet Computers," which is herein incorporated by reference in its entirety.

In some embodiments, the rotating elements 1635 can be configured to provide a controlled rotation or tilting of the electronic device assembly 1000 to facilitate and precisely adjust the positioning of the screen 3100. For example, the rotating elements 1635 can have shafts protruding outwardly from the brackets 1630 and bores recessing inwardly to the frame 2100 of the aircraft seat 2000 to receive the shafts. The shafts and/or the bores may engage in such a manner as to retard in a controlled manner the rotation of the shaft in the bores. For example, the shafts and the bores may have contact surfaces with topologies configured to increase friction in a controlled manner as the shafts are rotated inside the bores.

In some implementations, the electronic device assembly 1000 may be configured to be manually pivotably rotated by a passenger seated to the rear of the aircraft seat 2000 who is facing the electronic device 3000. In some examples, the passenger may manually tilt or rotate the electronic device assembly 1000 by pushing on the peripheral edges 1510 of the front frame 1500. For example, to rotate the electronic device assembly 1000 in an upward direction with respect to the $R_Z$ axis, the passenger may push on an upper portion of the peripheral edges 1510 of the front frame 1500. To rotate the electronic device assembly 1000 in a downward direction, the passenger may push on a lower portion of the peripheral edges 1510 of the front frame 1500. In other examples, the brackets 1630 and/or rotating elements 1635 may include rotary actuators (e.g., servo or stepper motors) that are configured to tiltably rotate the electronic device assembly 1000 in response to a received control signal from an input/output module (TOM), such as arm rest push buttons that are connected to the actuators via a wired or wireless connection.

Turning now to FIGS. 3A-3D, the electronic device assembly 1000 with a fixed back frame 31600 is illustrated. In some implementations, the electronic device assembly 1000 can be configured to be non-articulably (e.g., non-tiltably) affixed or mounted onto the aircraft seat 2000 or any other support structure within an aircraft cabin or passenger suite such as onto a wall, divider between passenger classes, and/or onto deployable arm. As shown in FIGS. 3A-3D, the electronic device assembly 1000 may include a fixed back frame 31600 instead of the articulable back frame 1600 illustrated in FIGS. 2A-2D while retaining identical or similar other components of the electronic device assembly 1000 such as the screen protector 1100, the adapter 1200, the power assembly 1300, the audio assembly 1400, the front frame 1500, and the bezels 1700.

In some implementations, the fixed back frame 31600 can include a fixed front portion 31610 that receives the tray 1210 of the adapter 1200, fixed sides 31620 that define a boundary of the fixed back frame 31600 around the fixed front portion 31610, a fixed back portion 31640 that faces and is adjacent to the aircraft seat 2000. In some aspects, the rear face 2002 of the upper seatback portion 2004 of the aircraft seat 2000 may include a shelf or recess into which the electronic device assembly 1000 is inserted or mounted such that an outer face of the electronic device assembly 1000 may be substantially flush with the rear face 2002 of the upper seatback portion 2004 of the aircraft seat 2000 when mounted to the aircraft seat 2000. In addition, the fixed back portion 31640 of the fixed back frame 31600 may abut the shelf or recess of the upper face 2002 when mounted to the upper seatback portion 2004 of the aircraft seat 2000. In some examples, unlike the back portion 1640 of the articulable back frame 1600 shown in FIGS. 2A-2D, the fixed back portion 31640 of the fixed back frame 31600 may be substantially flat.

In some embodiments, the fixed front portion 31610 of the fixed back frame 31600 may have fixed structural elements 31612 to provide rigidity to the fixed back frame 31600 in order to distribute impact loads in accordance with the HIC. For example, the fixed structural elements 31612 of the fixed back frame 31600 may be a number of fixed ridges 31622 that protrude substantially perpendicularly from the fixed back portion 31640 of the fixed back frame 31600 and form a ribbing on the fixed back portion 31640 of the fixed back frame 31600. In some examples, the ridges 31622 may be made of PEI or PSU plastic. In some examples, the ridges 31622 may be arranged in pre-determined patterns, such as in a zig-zag pattern, hash mark pattern, diagonal crisscross pattern, randomized pattern, or a combination of the patterns. In some implementations, the fixed ridges 31622 can cover an entirety of a surface of the fixed back portion 31640 and may not be restricted to a sub-surface located outside the channels 1660 as in the illustrative example shown in FIG. 2C.

Figure 3B:
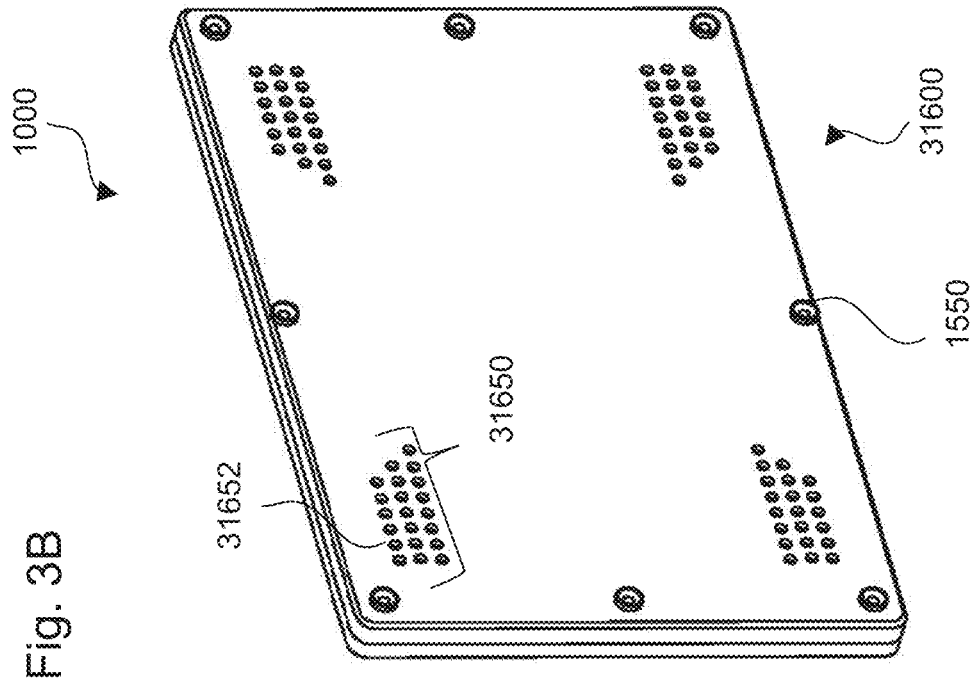
FIG. 3B is a rear perspective view of the electronic device assembly with the fix back frame.
Figure 3A:
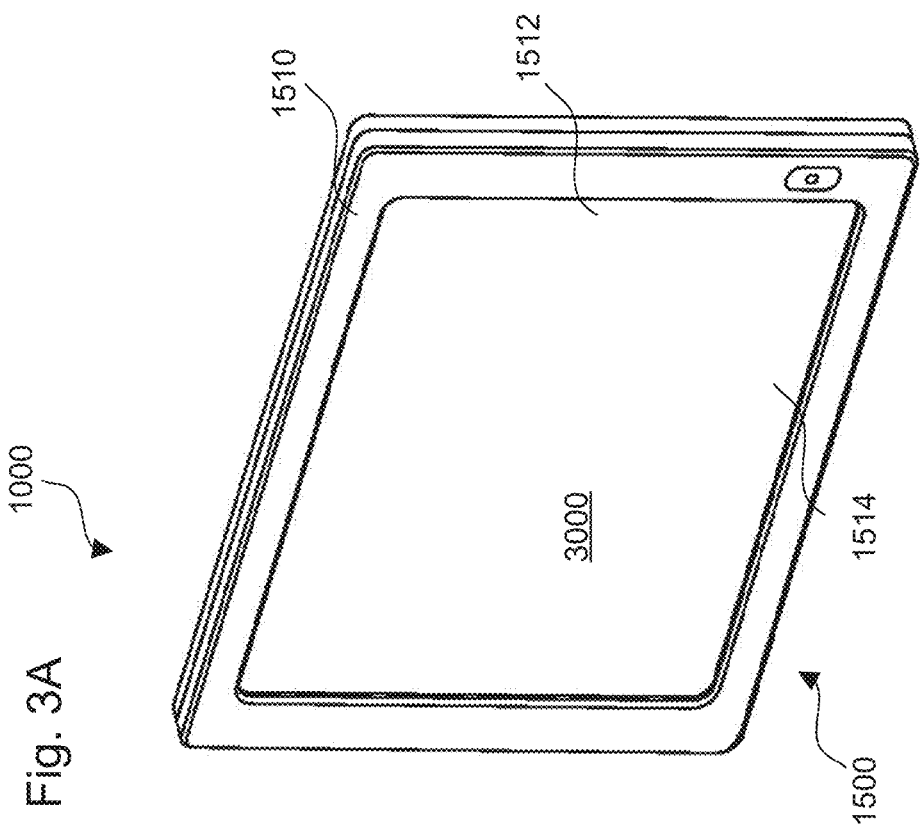
FIG. 3A is a front perspective view of the electronic device assembly with a fix back frame.
Figure 3C:
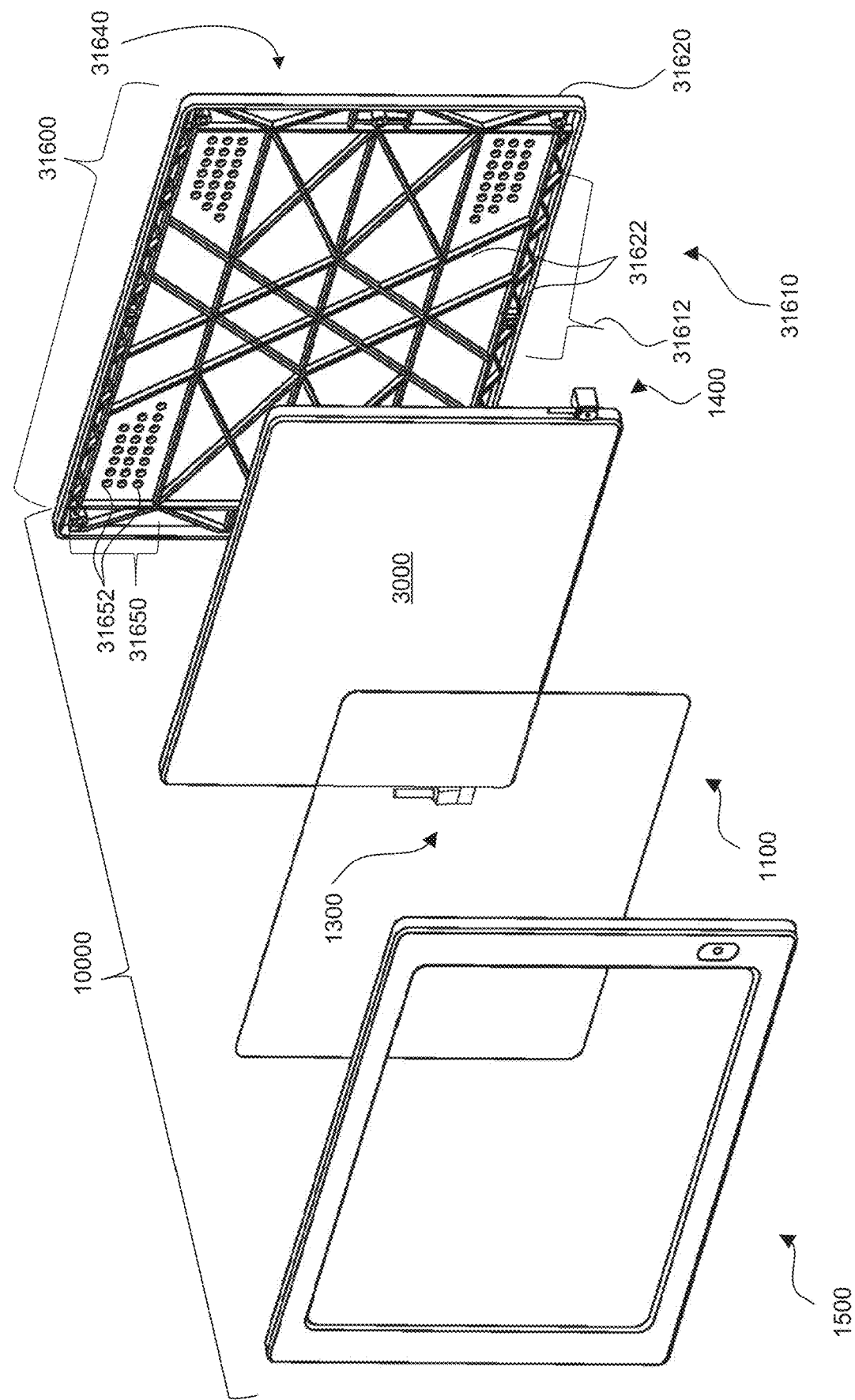
FIG. 3C is a front exploded view of the electronic device assembly with the fix back frame.
Figure 3D:
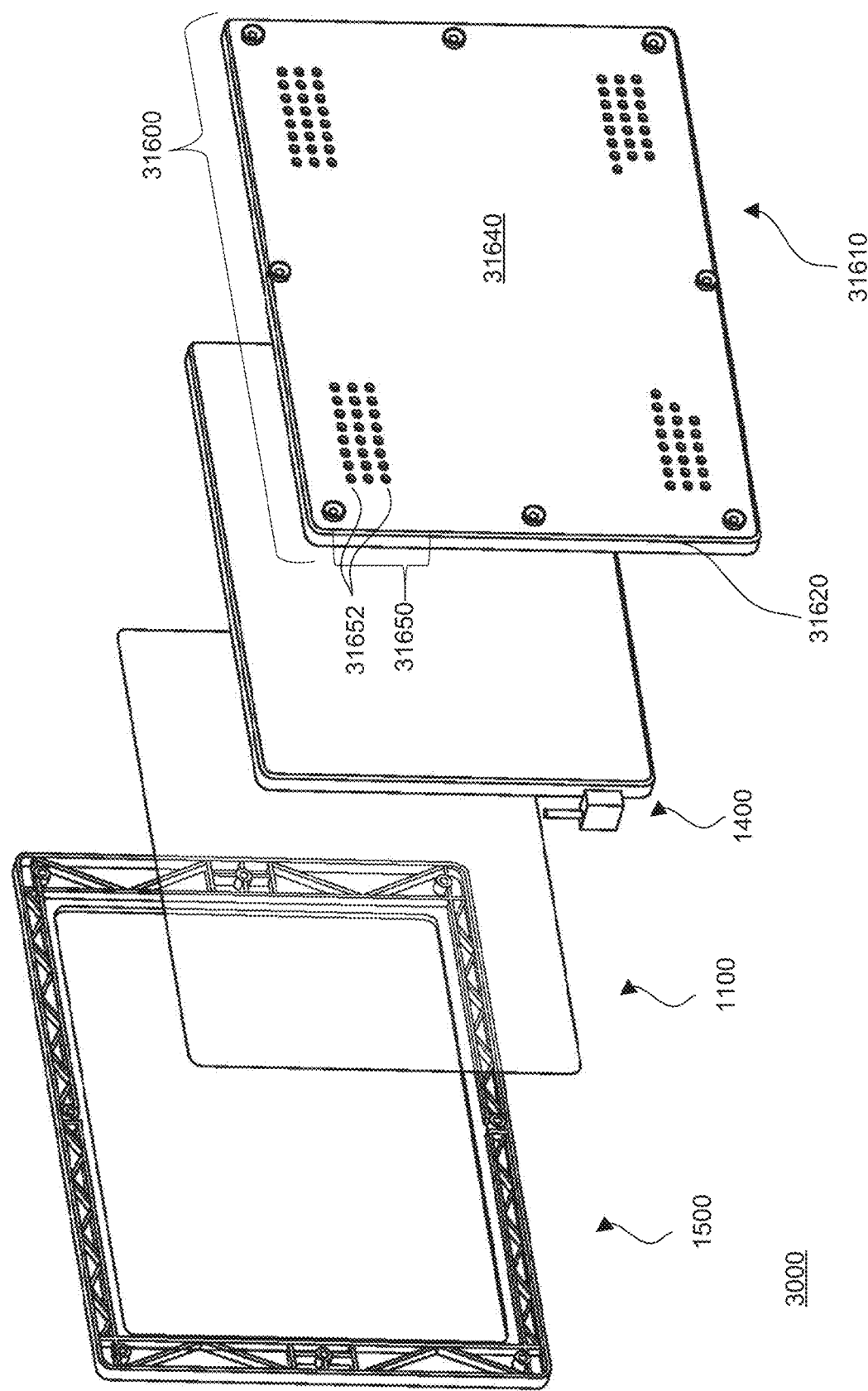
FIG. 3D is a back exploded view of the electronic device assembly with the fix back frame.

In some embodiments, the fixed back frame 31600 can include an aeration system 31650 to provide cooling to the electronic device 3000 that is enclosed within the electronic device assembly 1000. For example, the aeration system 31650 may include groups of fixed vent holes 31652 disposed at characteristic locations of the fixed back portion 31640 of the fixed back frame 31600 that allow heat to escape from the electronic device 3000 through the vent holes 31652. For example, the characteristic locations of the vent holes 31652 on the fixed back portion 31640 may correspond to locations of electronical elements of the electronic device 3000 that generate substantial amount of heat such as central processing units, graphical display cards, and/or correspond to locations of the fixed back frame 31600 that do not substantially affect a rigidity of the fixed back frame 31600, such as near corners of the fixed back portion 31640, as illustrated in FIG. 3D.

In some implementations, the fixed back frame 31600 can be made with the same and/or similar materials as the articulable back frame 1600. For example, the materials of the fixed back frame 31600 may include plastic materials such as PEI or PSU in order to reduce costs, and/or aluminum materials such as 6061-T6 aluminum to limit weight and the use of structural elements, such as the ridges 31622.

Turning now to FIGS. 4A-4D, the electronic device assembly 1000 having a nestable back frame assembly 21000 and an outer shell 22000 is illustrated. In some embodiments, the electronic device assembly 1000 can be articulably or tiltably mounted onto an outer shell 22000 that is inserted or mounted to the rear face 2002 of the upper seatback portion 2004 of the aircraft seat 2000, see FIGS. 2C-2D. In some examples, the use of the outer shell 22000 to mount the electronic device assembly 1000 can provide a pleasing or attractive appearance to the passenger as well as provide structural support for the electronic device assembly 1000 that may be mounted to the outer shell 22000.

In some implementations, the electronic device assembly 1000 may include a nestable back frame assembly 21000 instead of the articulable back frame 1600 while having identical or similar other components such as the screen protector 1100, the adapter 1200, the power assembly 1300, the audio assembly 1400, the front frame 1500, and the bezels 1700 as described above with respect to FIGS. 2A-2D. In some implementations, the nestable back frame assembly 21000 may include a nestable back frame 21600 mounted onto or within the outer shell 22000, a shroud 21700 that connects to and supports the nestable back frame 21600, and a nestable articulation mechanism 21800 to articulate or tilt the nestable back frame 21600 and the shroud 21700 within the electronic device assembly 1000.

In some embodiments, the outer shell 22000 may be configured to be mounted to the rear face 2002 of the upper seatback portion 2004 of the aircraft seat 2000 in order to receive the nestable back frame 21600 of the electronic device assembly 1000 while providing a more pleasing appearance to the passenger facing the screen 3100 of the electronic device 3000. For example, the outer shell 22000 may include a front portion 22610 that faces the passenger sifting in a seat directly to the rear of the aircraft seat 2000 to which the outer shell 22000 is mounted. In addition, the front portion 22610 may include an opening 22100 into which the nestable back frame assembly 21000 may be inserted, a flange 22200 extending around the opening 22100, and an apron 22300 protruding from the opening 22100 towards an internal volume of the aircraft seat 2000. In some examples, the apron 22300 may function as a mount for a seatback headrest. For example, the seatback headrest may include a molded cushion having a shape and dimensions that substantially correspond to dimensions defined by protrusions of the apron 22300 such that the headrest can be inserted onto the apron 22300.

In some implementations, the front portion 22610 can include aesthetic elements to provide a please or attractive appearance to the passenger. For example, the aesthetic elements may include surfaces having a smooth finish or rounded edges and/or corners. In some examples, rather than being mounted to the upper seatback portion 2004 of the aircraft seat 2000, the outer shell 22000 may be used instead of the upper portion 2004 of the aircraft seat 2000 and directly attach to an upper portion of the seatback frame 2100 such that the outer shell 22000 forms a monolithic frame for an upper portion of the seatback.

In some examples, the flange 22200 of the outer shell 22000 may be configured to hide unaesthetic elements of the aircraft seat 2000 from view of the passengers and provide a smooth finish for the electronic device assembly 1000. In some aspects, the unaesthetic elements may include wires, cut tissue, or gaps. In some implementations, the flange 22200 may include a lip 22210 that is configured to be tightly sealed to the rear face 2002 of the upper seatback portion 2004 of the aircraft seat 2000 such that no gaps exist between a surface of the flange 22200 that is mounted to the rear face 2002 of the upper seatback portion 2004 of the aircraft seat 2000.

In some implementations, the flange 22200 may be configured to provide structural integrity or support to the outer shell 22000 and/or the electronic device assembly 1000. For example, the flange 22200 can include a number of ridges 22220 located between the opening 22100 of the outer shell 22000 and the lip 22210 of the flange 22200 that protrudes substantially outward from the flanges 2200 and towards the aircraft seat 2000 to provide strength and rigidity to the outer shell 22000. In another example, the flange 22200 can include bores 22230 to provide support and/or threading for fastening devices, such as screws, bolts, or the like. For example, the flange 2220 may be mounted to the rear face 2002 of the upper seatback portion 2004 of the aircraft seat 2000 by mounting or inserting the bores onto complementary fittings disposed on the upper seatback portion 2004 of the aircraft seat 2000.

In some examples, the flange 22200 may also be configured to facilitate air circulation and/or sound circulation throughout the outer shell 22000 and/or electronic device assembly 1000. For example, the flange 22200 can include a vent grid 22240 located on a top portion of the outer shell 22000 to allow hot air that may be generated by components of the electronic device 3000 to escape from the outer shell 22000 into the aircraft cabin through holes or openings in the vent grid 22240.

In some embodiments, the nestable back frame 21600, as for the articulable back frame 1600, may have structural elements 21620 to provide rigidity to the nestable back frame 21600 in order to distribute impact loads in accordance with the head injury criterion (HIC). For example, the structural elements 21620 may include ridges 21622 that protrude substantially perpendicularly from the nestable back frame 21620 and towards the electronic device 3000 as shown in FIG. 4D. In some examples, the ridges 21622 may be made of PEI or PSU plastic. In some examples, the ridges 21622 may be arranged in pre-determined patterns on the nestable back frame 21620, such as in a zig-zag pattern, hash mark pattern, diagonal crisscross pattern, randomized pattern, or a combination of the patterns. In an alternative example, the nestable back frame 21620 may be manufactured without ridges 21622, and instead of the front portion 1514 and the back portion 1516 of the peripheral border 1510 may be made of a material such as aluminum (e.g. 6061-T6 aluminum) that provides structural support and adheres to both HIC and flammability specifications. In some embodiments, the shroud 21700 can add additional rigidity to the nestable back frame 21600 while limiting weight increase of the electronic device assembly 1000. For example, the shroud 21700 may be a perforated rigid plate having perforations or holes disposed across a surface of the shroud 21700.

In some implementations, the shroud 21700 can include fastening elements 21710 to facilitate an attachment of the shroud 21700 to the nestable back frame 21600. For example, the fastening elements 21710 may be key shaped holes 21712 to receive fasteners such as screws or bolts.

In some implementations, a shape of the shroud 21700 may match or complement a shape of the back portion of the nestable back frame 21600. For example, the shroud 21700 can have passages 21720 at locations that correspond to protrusions 21640 of the back portion of the nestable back frame 21600 such that the protrusions 21640 fit snugly within the passages 21720 when the shroud 21700 is mounted to the nestable back frame 21600. In another example, the shroud 21700 may have cam holes 21722 (e.g. square shaped holes) to receive cams 21630 that protrude from the back portion of the nestable back frame 21600.

Figure 4A:
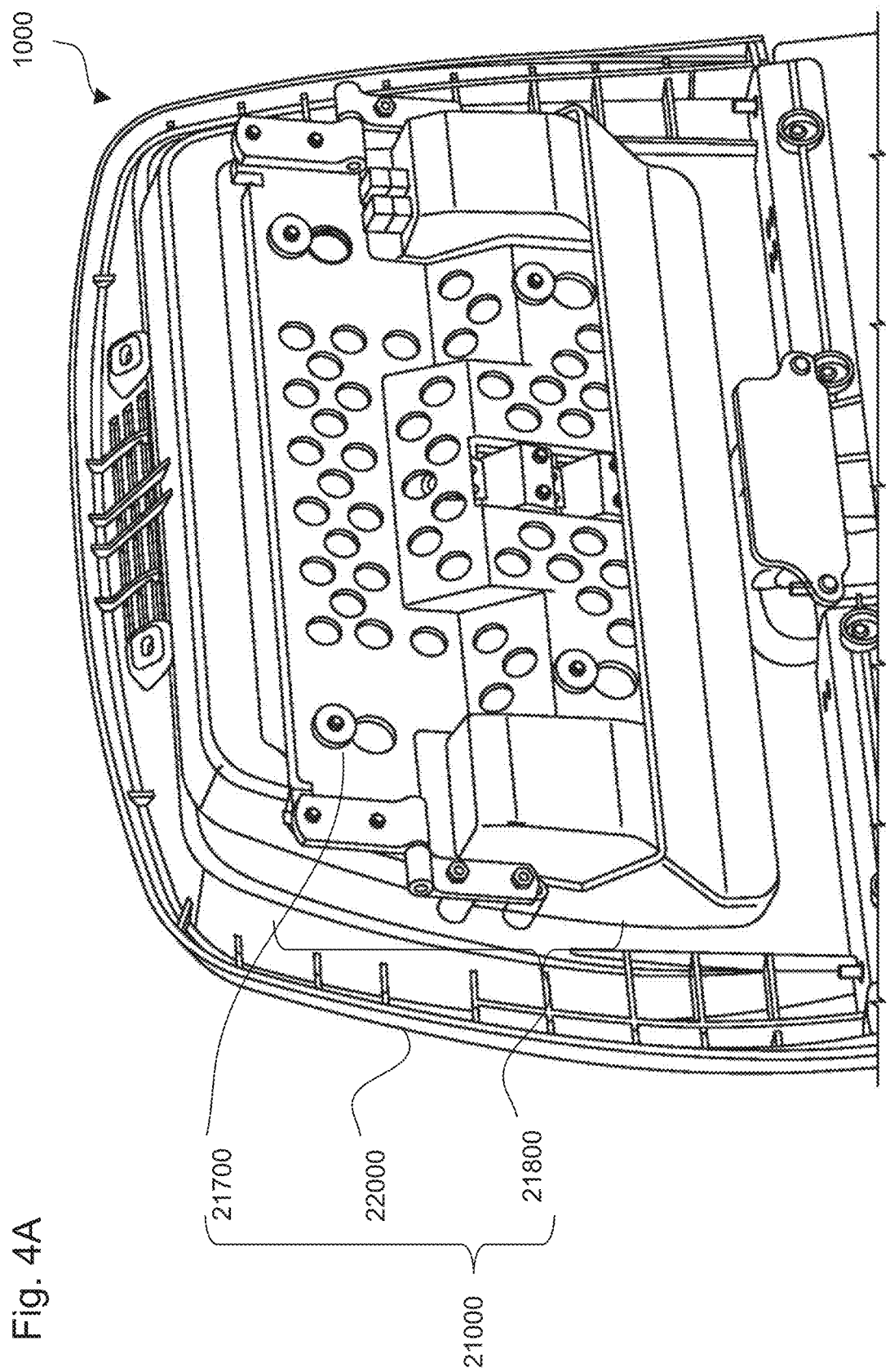
FIG. 4A is a rear perspective view of the electronic device assembly with a nestable back frame assembly and with a nestable support structure.
Figure 4B:
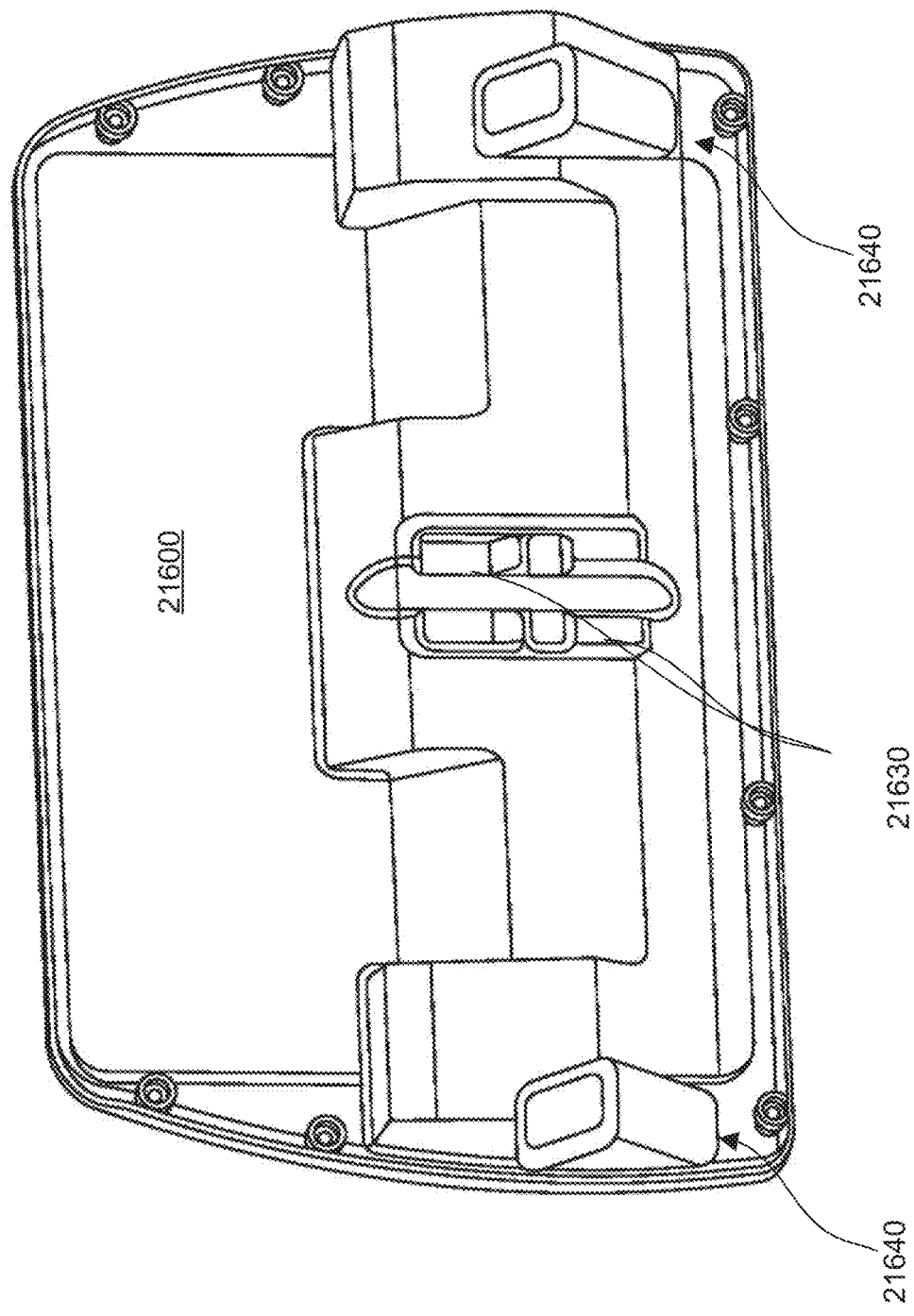
FIG. 4B is a rear perspective view of the electronic device assembly with a nestable back frame assembly and without the nestable support structure.
Figure 4C:
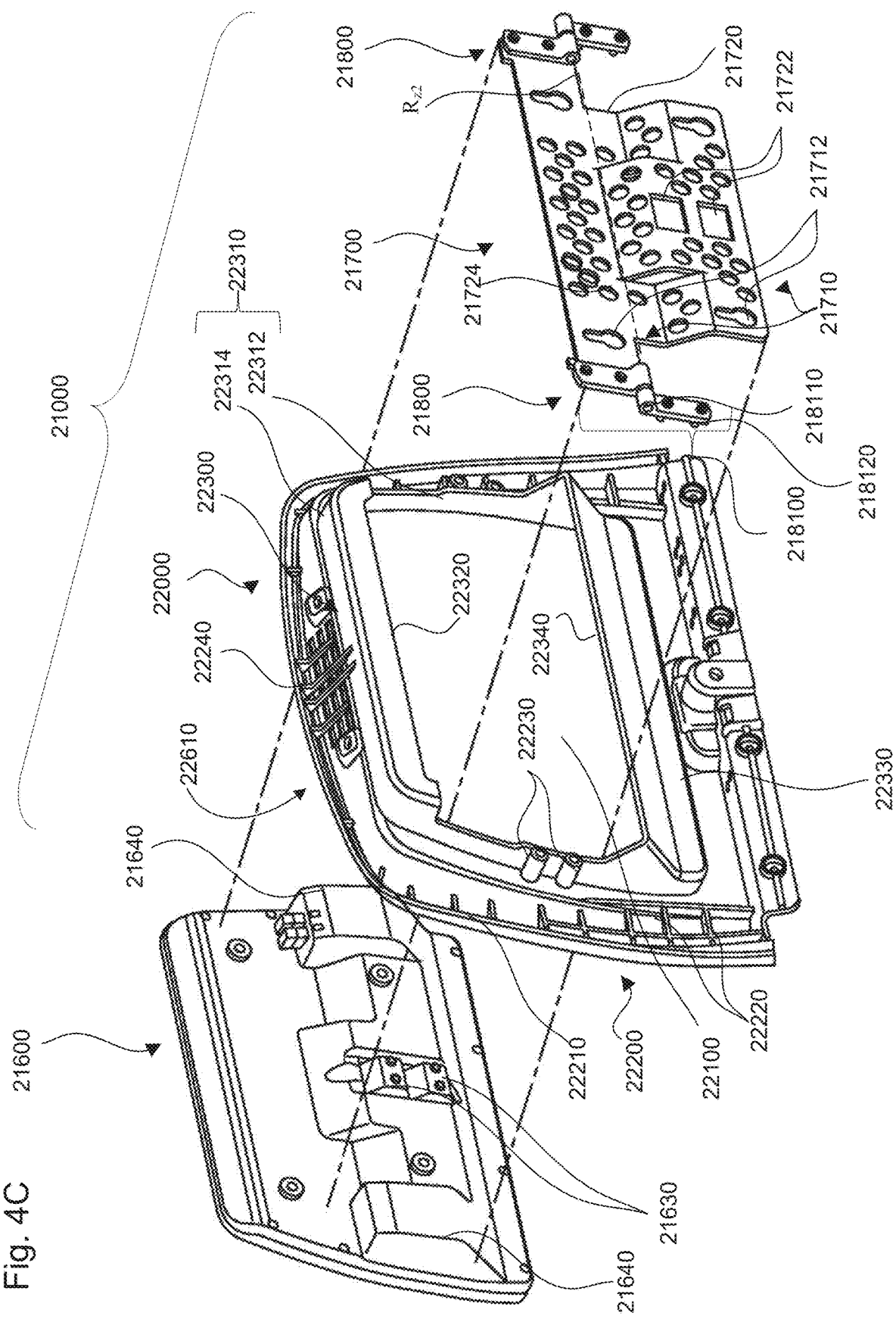
FIG. 4C is a back exploded view of the electronic device assembly with the nestable back frame assembly.
Figure 4D:
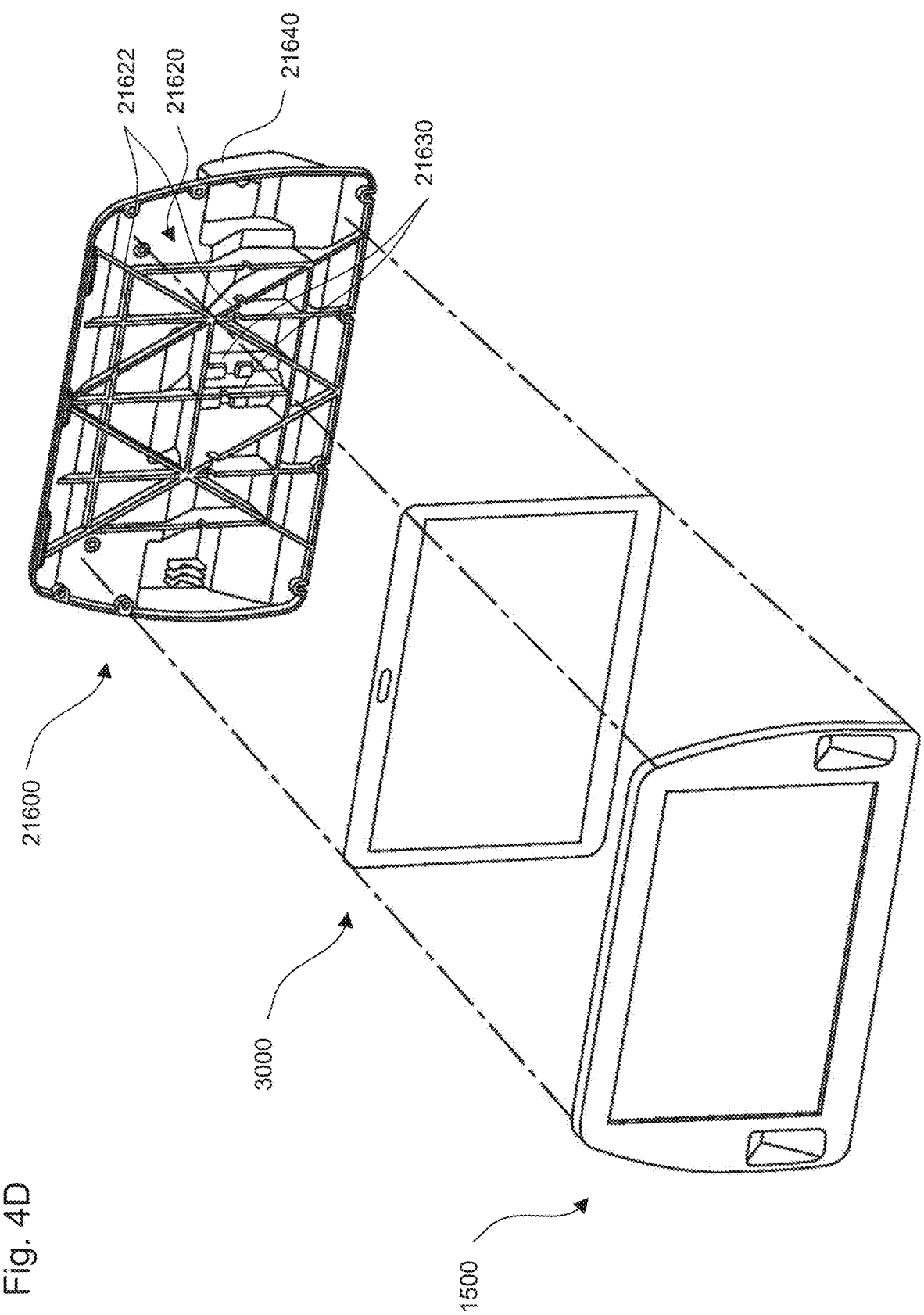
FIG. 4D is a front exploded view of the electronic device assembly with the nestable back frame assembly.

In some embodiments, the nestable articulation mechanism 21800 of the nestable back frame assembly 21000 may be configured to provide tiltable rotation of the electronic device assembly 1000 around a second axis of rotation $R_{Z2}$ as shown in FIG. 4C, such that the electronic device assembly 1000 may be tilted forward and rearward about the $R_{Z2}$ axis, which corresponds to a location of the pair of hinges 218100. For example, the nestable articulation mechanism 21800 may include a pair of hinges 218100 with a pair of pins 218110 affixed to lateral parts of the structural support and with a pair of leaves 218120 affixed to the bores 22230 of the flange 22200 to receive the pair of pins 218110. The electronic device assembly 1000 having a nestable back frame assembly 21000 and an outer shell 22000 may be manually or electronically tilted about the axis $R_{Z2}$ provided by the hinges 218100 as described above with respect to FIGS. 2A-2D.

In some embodiments, the apron 22300 of the nestable back frame assembly 21000 may be configured to limit an amount of tilt of the electronic device assembly 1000 and to impede visualization of elements located behind the outer shell 22000 such as internal parts of the aircraft seat 2000, the power cable 1310 of the power assembly 1300, and/or the audio cable from the audio assembly 1400. In some implementations, the apron 22300 may include protrusions 222310 configured to impede visualization of the elements behind the outer shell 22000. For example, the protrusions 22310 may include vertical protrusions 22312 to prevent visualization from lateral fields of view and horizontal protrusions 22314 to prevent visualization from top and bottom fields of view.

In some implementations, the apron 22300 may include a top stop 22320 to limit the amount of tilt of the electronic device assembly 1000 in the forward direction and a bottom stop 22330 to limit the amount of tilt of the electronic device assembly 1000 in the rearward direction. In one example, the top stop 22320 and the bottom stop 22330 may be adjacent to the horizontal protrusions 22314 and extend between the vertical protrusions 22312. In some implementations, the apron 22300 may also include a tongue 22340 to prevent elements from the internal volume of the aircraft seat 2000, such as wires or padding, to interfere with the articulation or tilting of the electronic device assembly 1000. For example, the tongue 22340 may be placed adjacent to the bottom stop 22330 and protrude in an oblique direction towards the internal volume of the aircraft seat 2000.

Figure 5A:
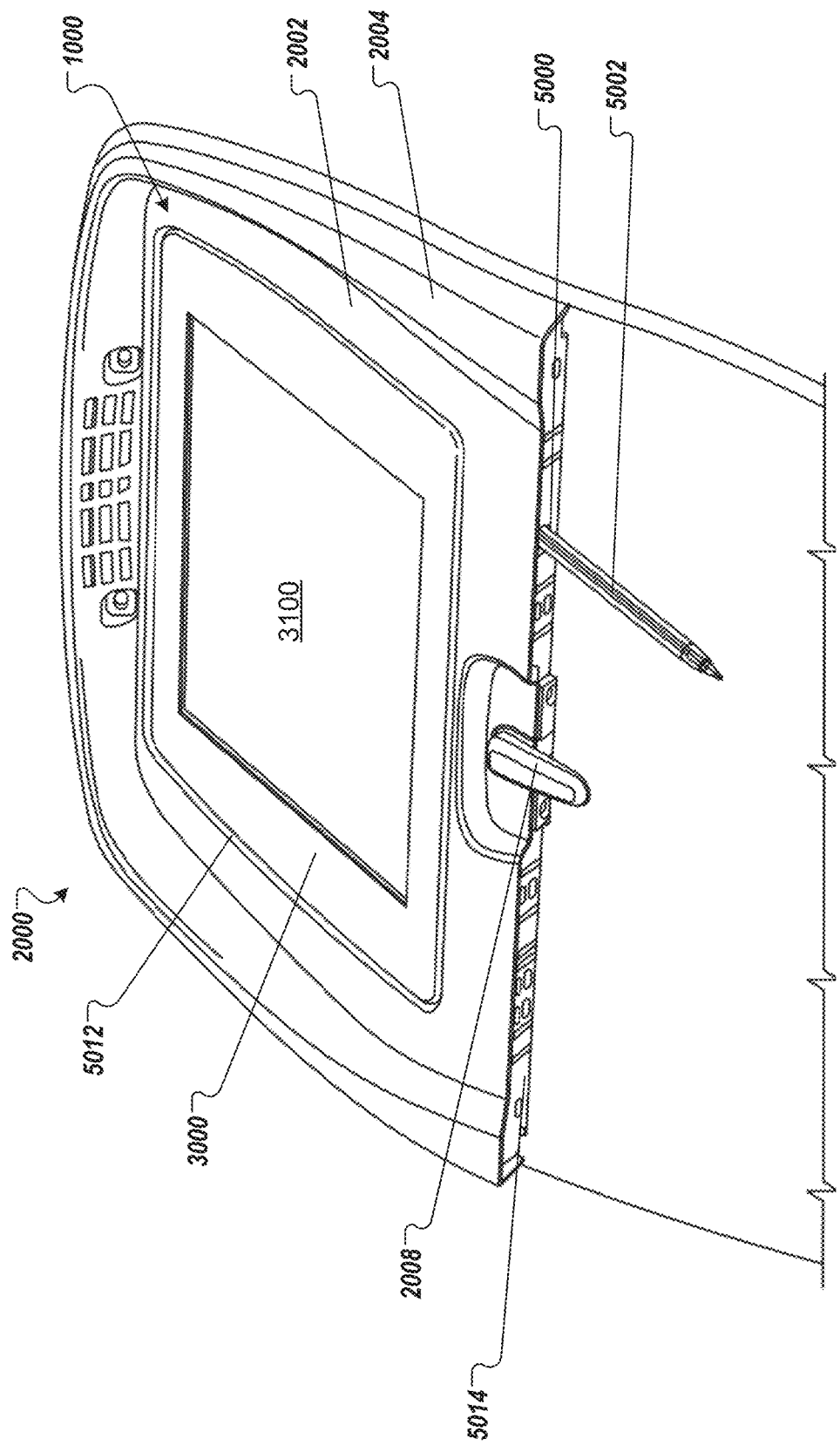
FIGS. 5A-5B illustrate a quick release mechanism for the electronic device assembly.
Figure 5B:
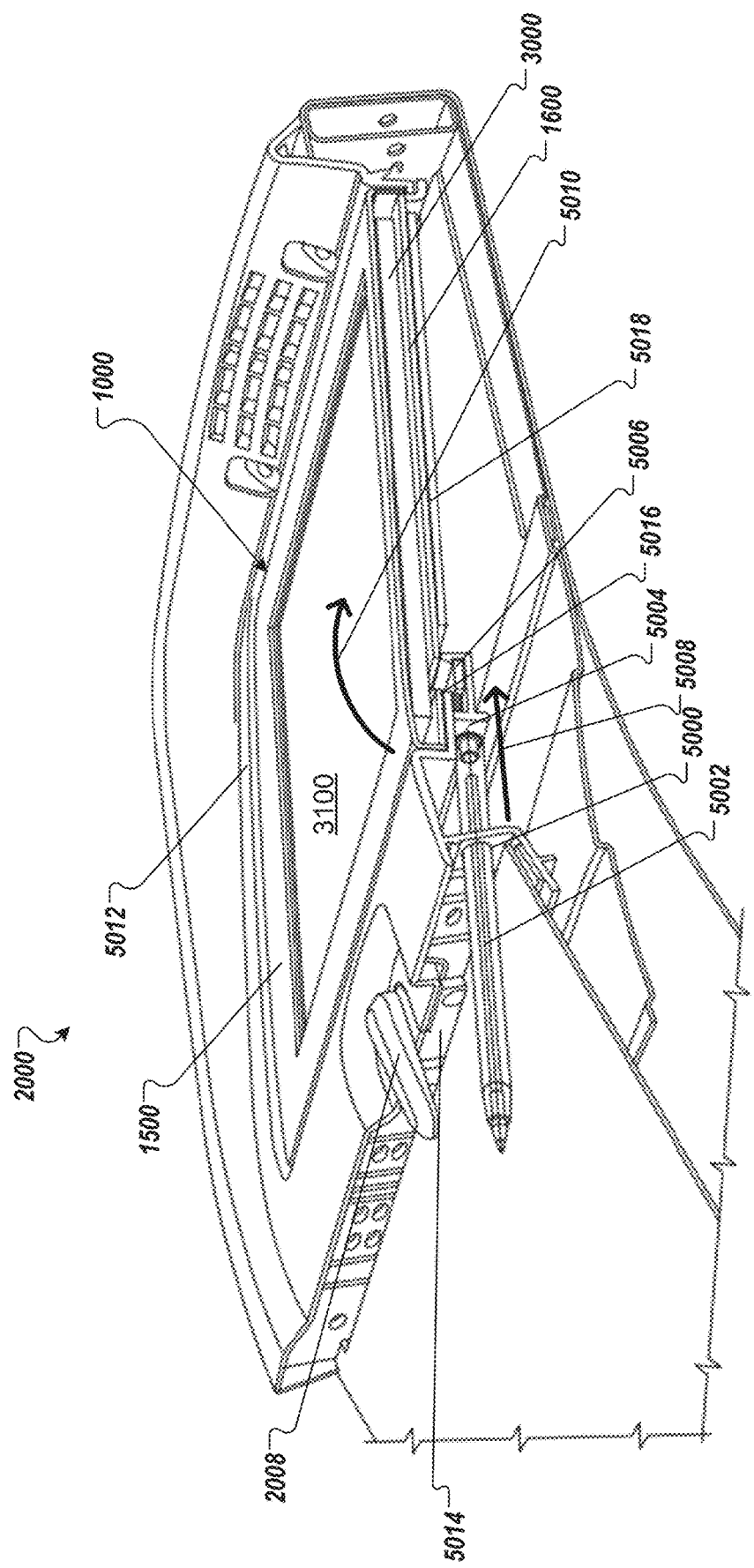

Turning to FIGS. 5A-5B, a quick release mechanism 5004 for the electronic device assembly 1000 is illustrated. In some implementations, the electronic device assembly 1000 may be releasably latched within a recess 5012 in the upper face 2002 of the upper seatback portion 2004 of the aircraft seat 2000 to provide for removable of the electronic device assembly 1000 for maintenance or replacement of the electronic device 3000, screen protector 1100, adapter 1200, or any other component of the electronic device assembly 1000. For example, the quick release mechanism 5004 may allow a maintenance crew to quickly replace an entire electronic device assembly 1000 or just the electronic device 3000 within the assembly. In some examples, when the electronic device assembly 1000 is inserted into the recess 5012, an upper end 5018 of a bottom surface of the recess 5012 mates with a lower end 5016 of the bottom surface of the recess 5012 as the electronic device assembly 1000 pushes against the upper end 5018 of the bottom surface of the recess 5012. In addition, a spring 5006 connected to the quick release mechanism 5004 extends and becomes loaded, and the quick release mechanism 5004 locks and secures the electronic device assembly 1000 in place within the recess 5012.

In some examples, the quick release mechanism 5004 may be hidden from or inaccessible by the passenger. For example, the upper seatback portion 2004 of the aircraft seat 2000 may include a lower edge 5014 that makes obtaining access to the quick release mechanism 5004 more difficult. In some implementations, the lower edge 5014 may include an access hole 5000 aligned with the quick release mechanism 5004 that is sized to allow an activation device 5002, such as a pen or other device that is able to fit through the access hole 5000 to engage the quick release mechanism 5004 and unlatch the electronic device assembly 1000. In some examples, the size of the access hole 5000 may be small enough so that a finger cannot be inserted into the access hole 5000. In another implementation, the quick release mechanism 5004 may include a keyed surface configured to mate with a complementarily keyed activation device 5002 such that only an activation device 5002 having a complementarily keyed surface is able to engage the quick release mechanism 5004 to unlatch the electronic device assembly 1000 from the recess 5012.

In some examples, when the quick release mechanism 5004 is engaged by inserting the activation device 5002 through the access hole 5000 and depressing the quick release mechanism 5004 in the direction of arrow 5008, the spring 5006 is unloaded and recoils, which unlatches the electronic device assembly 1000 by forcing an upper end 5018 of a bottom surface of the recess 5012 away from a lower end 5016 of the bottom surface of the recess 5012, which allows the electronic device assembly 1000 to be removed by rotating the assembly 1000 in the direction of arrow 5010.

Figure 6A:
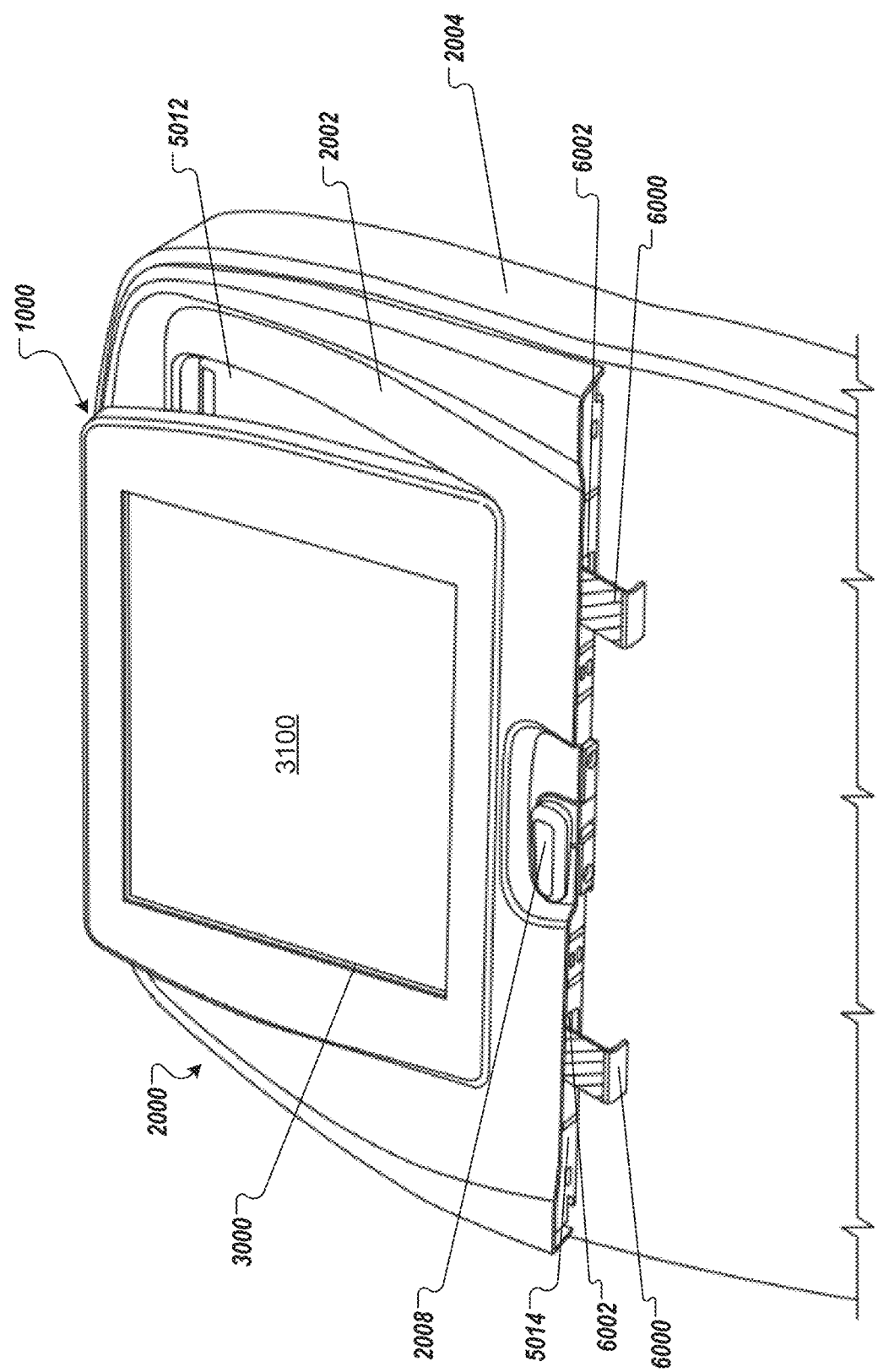
FIGS. 6A-6B illustrate a quick release mechanism for the electronic device assembly.
Figure 6B:
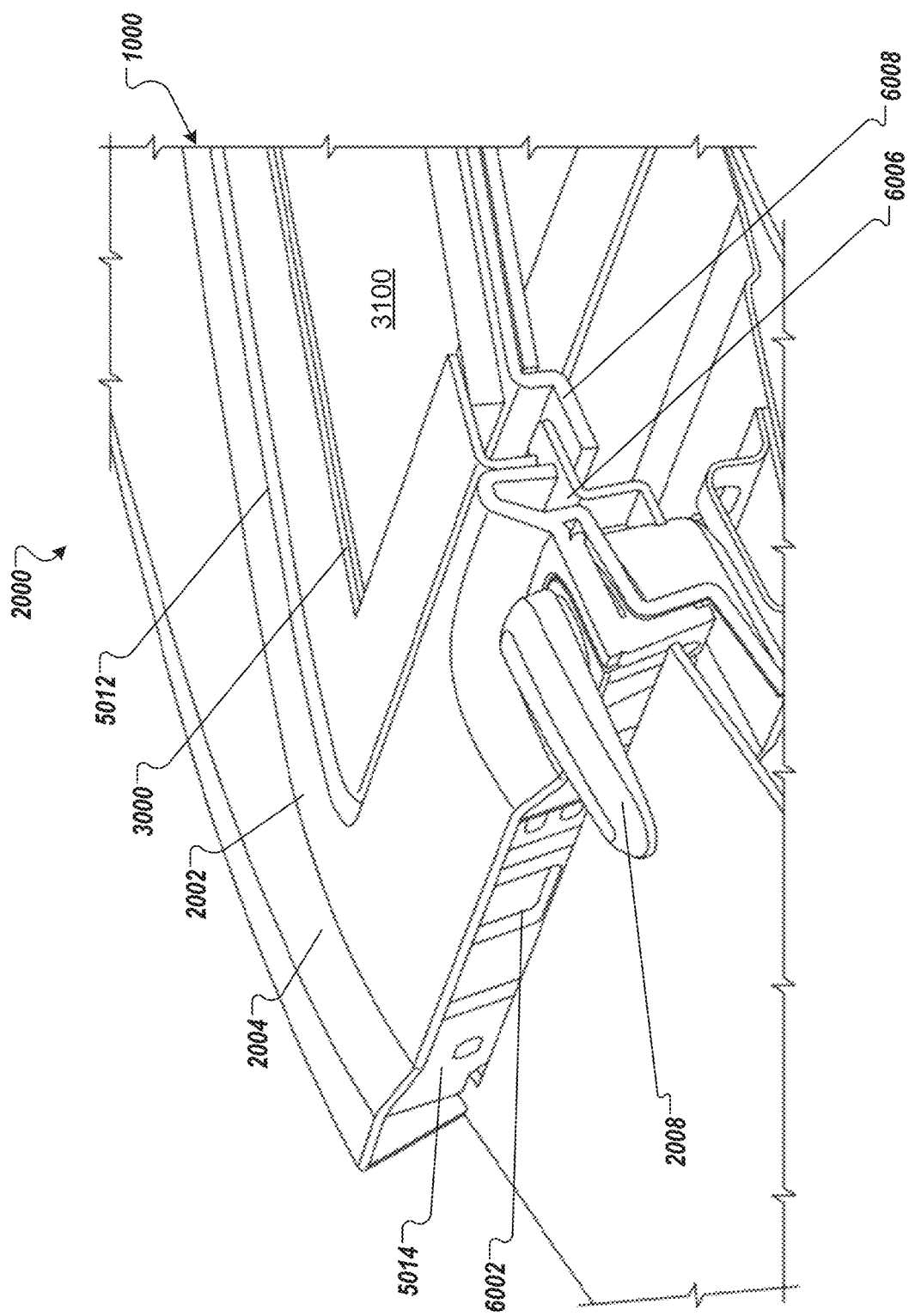

Turning to FIGS. 6A-6B other implementations of a quick release mechanism for the electronic device assembly 1000 is illustrated. For example, FIG. 6A illustrates an electronic device assembly 1000 that has been unlatched and partially removed from a recess 5012 in a rear face 2002 of an upper portion 2004 of the aircraft seat 2000 by pulling quick release mechanisms 6000 away from a lower surface 5014 of the upper portion 2004 of the aircraft seat 2000. In some implementations, the quick release mechanisms 6000 include tabs that may be inserted within holes 6002 when the electronic device assembly 1000 is inserted within the recess 5012. As the quick release mechanisms 6000 are pulled out of the holes 6002 and away from the lower surface 5014, the electronic device assembly 1000 may be released from the recess 5012 in the upper seatback portion 2004 of the aircraft seat 2000.

In some examples, the quick release mechanisms 6000 may be coupled to a latching mechanism that holds the electronic device assembly 1000 in place within the recess 5012. For example, when the tabs of the quick release mechanisms 6000 are inserted within the holes 6002 and the electronic device assembly 1000 is inserted into the recess 5012, the tabs act as latching mechanisms that the hold the electronic device assembly 1000 in place within the recess 5012 by an outer edge of the electronic device assembly 1000 or engaging a complementary latch fitting (not shown) disposed on the electronic device assembly 1000. When the tabs of the quick release mechanisms 6000 are pulled out of the holes 6002, the tabs release the electronic device assembly 1000 from the recess 5012 in the back upper portion 2004 of the aircraft seat 2000.

In some examples, the tabs of the quick release mechanisms 6000 may also function as visual indicators to the passenger or flight crew personnel within the aircraft cabin that the electronic device assembly 1000 is unlatched and not secured within the recess 5012. In addition, the tabs of the quick release mechanisms 6000 may prevent a tray table (not shown) from being stowed in the upright, taxi, take-off, and landing (TTOL) position, providing an additional reminder that the electronic device assembly 1000 is not secured within the recess 5012 of the aircraft seat 2000. In addition, in order to access the quick release mechanisms 6000 within the holes 6002, the tray table may have to be in a deployed (open) position. Optionally, an additional mechanism 6006 (FIG. 6B) may prevent the quick release mechanisms 6000 from actuating and releasing the electronic device assembly 1000 from the recess 5012 unless a tray table latch 2008 is not in a vertical position, which may provide additional security that the electronic device assembly 1000 will not be inadvertently disengaged by a passenger. For example, when the tray table is in a stowed position, the tray table latch 2008 may be in a vertical position, which locks the tray table in the stowed position, making the quick release mechanisms 6000 inaccessible. In the example of FIG. 6A, the tray table latch 2008 is in a horizontal position that is configured to release the tray table to the deployed position, and the additional latching mechanism coupled to the tray table latch 2008 allows the quick release mechanisms 6000 to release the electronic device assembly 1000 from the recess 5012.

FIG. 6B illustrates a cutaway view of the electronic device assembly 1000 inserted within the recess 5012 with the additional latching mechanism 6006 coupled to the tray table latch 2008 that is configured to prevent ejection of the electronic device assembly 1000 when the tray table latch 2008 is in a vertical position as shown in FIG. 6B. In some implementations, the additional latching mechanism 6006 is configured to rotate as the tray table latch 2008 is rotated. For example, as the tray table latch 2008 is rotated in a clockwise or counter-clockwise direction, the additional latching mechanism 6006 correspondingly rotates in the clockwise or counter-clockwise direction. When the tray table latch 2008 is in the vertical position, the additional latching mechanism 6006 engages the electronic device assembly 1000 to prevent the electronic device assembly 1000 from being ejected from the recess 5012 of the aircraft seat 2000. In some implementations, the electronic device assembly 1000 may include an additional contact surface 6008 that protrudes from the electronic device assembly 1000, which allows the additional latching mechanism 6006 to secure the electronic device assembly 1000 within the recess 5012 when the tray table latch 2008 is in the vertical position in order to prevent ejection of the electronic device assembly 1000 by the quick release mechanisms 6000. When the tray table latch 2008 is rotated out of the vertical position, the additional latching mechanism 6006 is also rotated away from the additional contact surface 6008, thereby permitting engagement of the quick release mechanisms 6000 to eject the electronic device assembly 1000 from the recess 5012.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A frame assembly for enclosing an electronic device mounted to a rear surface of a seatback of an aircraft seat, the frame assembly comprising:
    a rear frame configured to receive a rear surface the electronic device, wherein the rear frame is mounted within a recess of the rear surface of the seatback;
    a front frame detachably connected to the rear frame such that the electronic device, when mounted in the frame assembly, is enclosed between the front frame and rear frame, the front frame including an opening defining a boundary of a visible screen region of the electronic device; and
    a foam adapter disposed between the rear frame and the rear surface of the electronic device, the foam adapter including
        an aperture configured to receive the rear surface of the electronic device, the aperture having a length and width that substantially correspond to dimensions of the electronic device, and
        raised peripheral edges surrounding the aperture, the raised peripheral edges having a length and width that correspond to dimensions of the rear frame such that the raised peripheral edges are configured to adapt the dimensions of the electronic device to the dimensions of the rear frame.

2. The frame assembly of claim 1, wherein the rear frame includes pivotable mounting fixtures affixed proximate each vertical side of the rear frame; the pivotable mounting fixtures configured to pivotably attach the rear frame of the frame assembly to the seatback of the aircraft seat.

3. The frame assembly of claim 2, wherein the rear frame is configured tee pivotably rotate about an axis defined by pivotable attachment locations of the pivotable mounting fixtures to the rear flame such that the screen of electronic device is configured to maintain a vertical orientation independent of a position of the seatback.

4. The frame assembly of claim 1, wherein the frame assembly mounts to a headrest region of the seatback.

5. The frame assembly of claim 1, wherein the rear frame further comprises a power connector aperture for connecting power to the electronic device.

6. The frame assembly of claim 1, wherein the front frame further comprises a power control aperture for accessing a power control of the electronic device.

7. The frame assembly of claim 1, wherein the foam adapter comprises at least one aperture for passing a power cord from the electronic device to a power connector.

8. The frame assembly of claim 1, further comprising a quick release mechanism for removing the frame assembly from the seatback.

9. The file frame assembly of claim 1, wherein the rear frame further comprises an audio connector aperture for directing audio output from the electronic device to an external audio connection.

10. A system for mounting an electronic device within a seatback of an aircraft passenger seat, the system comprising:
- a seatback of a passenger seat comprising a seatback frame having an upper portion for supporting a headrest of the passenger seat, the upper portion of the seatback frame including
  - a curved member substantially framing an upper region of the passenger seat, and
  - a cross-member mounted laterally between opposing ends of the curved member;
- a frame assembly comprising
  - a rear frame member con figured to receive a rear surface of an electronic device,
  - a front frame member detachably connected to the rear frame member such that the electronic device, when mounted in the frame assembly, is enclosed between the front frame member and rear frame member, the front frame member including an opening defining a boundary of a visible screen region of the electronic, device; and
  - a foam adapter disposed between the rear frame member and the rear surface of the electronic device, the foam adapter including an aperture configured to receive the rear surface of the electronic device, the aperture having a length and width that substantially correspond to dimensions of the electronic device, and raised peripheral edges surrounding the aperture, the raised peripheral edges having a length and width that correspond to dimensions of the rear frame member such that device to the dimensions of the rear frame member; and
- at least one mounting fixture for releasably mounting the frame assembly within a headrest aperture of the seatback frame, wherein the headrest aperture is defined at least in part by the intersection of the cross-member with the curved member;

wherein, upon mounting, the visible screen region of the electronic device is presented to an aft-seated passenger, and the frame assembly is disposed behind a headrest provided for the passenger seated in the aircraft passenger seat.

11. The system of claim 10, further comprising a quick release mechanism for removing the frame assembly from the seatback.

12. The system of claim 10, wherein the at least one mounting fixture comprises a set of pivotable mounting fixtures configured for connection proximate each vertical side of the rear frame, the pivotable mounting fixtures configured to pivotably attach the rear frame of the frame assembly to the seatback frame.

13. The system of claim 10, wherein the rear frame member comprises at least one channel for receiving a power cord connecting a power connector of the electronic device to a power source.

14. The system of claim 10, wherein the at least one mounting fixture comprises a shroud member configured for attachment to the rear frame member, the shroud member including at least one pivoting mechanism for pivoting attachment to the seatback frame.

15. The system of claim 10, further comprising a shell insertable into the headrest aperture, wherein the frame assembly mounts to the shell.

16. The system of claim 15, wherein the shell comprises at least one protrusion for limiting pivot range of the frame assembly.

17. The system of claim 10, wherein the electronic device is a tablet computer comprising a touch screen, the frame assembly further comprising a screen protector disposed between the front frame member and the electronic device, wherein the screen protector comprises electrically transparent material for supporting touch screen interaction with the electronic device.

* * * * *